United States Patent
Tamura et al.

(10) Patent No.: US 8,546,030 B2
(45) Date of Patent: Oct. 1, 2013

(54) HYDROGEN GENERATOR, FUEL CELL SYSTEM COMPRISING HYDROGEN GENERATOR, AND OPERATION METHOD OF HYDROGEN GENERATOR, AND OPERATION METHOD OF FUEL CELL SYSTEM

(75) Inventors: Yoshio Tamura, Hyogo (JP); Kiyoshi Taguchi, Osaka (JP); Yoshikazu Tanaka, Shiga (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 12/856,284

(22) Filed: Aug. 13, 2010

(65) Prior Publication Data

US 2010/0304247 A1 Dec. 2, 2010

Related U.S. Application Data

(63) Continuation of application No. PCT/JP2010/002071, filed on Mar. 24, 2010.

(30) Foreign Application Priority Data

Mar. 25, 2009 (JP) .................................. 2009-073348

(51) Int. Cl.
 *H01M 8/06* (2006.01)
 *C01B 3/02* (2006.01)
(52) U.S. Cl.
 USPC ...................... 429/423; 48/197 R; 423/648.1
(58) Field of Classification Search
 USPC .................. 429/423; 48/197 R; 423/648, 17
 See application file for complete search history.

(56) References Cited

U.S. PATENT DOCUMENTS

2008/0102331 A1* 5/2008 Takada ............................ 429/20
2008/0160361 A1 7/2008 Ohara et al.
(Continued)

FOREIGN PATENT DOCUMENTS

CN 101006604 A 7/2007
JP 2002-151124 5/2002
(Continued)

OTHER PUBLICATIONS

Machine translation of JP 2006-310291, Nov. 2006.*
(Continued)

*Primary Examiner* — Jonathan Crepeau
(74) *Attorney, Agent, or Firm* — McDermott Will & Emery LLP

(57) ABSTRACT

A hydrogen generator comprises a reformer configured to generate a hydrogen-containing gas through a reforming reaction in an internal space thereof using a material gas and steam; a material gas supply passage through which the material gas is supplied to the reformer; a material gas supplier which is provided at the material gas supply passage to supply the material gas to the reformer; a first valve configured to open and close the material gas supply passage; an evaporator configured to generate a steam supplied to the reformer; a water supplier configured to supply water to the evaporator; a communicating passage for allowing the reformer to communicate with atmosphere; a second valve configured to open and close the communicating passage; and a controller configured to stop the material gas supplier and the water supplier and close the first valve and the second valve at shutdown of the hydrogen generator; and open the second valve prior to opening the first valve when the material gas supplier resumes supply of the material gas to the reformer after the shutdown.

8 Claims, 13 Drawing Sheets

(56) References Cited

U.S. PATENT DOCUMENTS

2009/0087701 A1   4/2009   Kuwaba
2010/0062294 A1   3/2010   Tamura

FOREIGN PATENT DOCUMENTS

| | | |
|---|---|---|
| JP | 2003-288930 | 10/2003 |
| JP | 2006-278108 | 10/2006 |
| JP | 2006-310291 | 11/2006 |
| JP | 2007-254251 | 10/2007 |
| JP | 2008-266118 | 11/2008 |
| WO | WO 2007/145321 A1 | 12/2007 |
| WO | WO 2008/126686 A1 | 10/2008 |

OTHER PUBLICATIONS

Chinese Office Action dated Jun. 3, 2013 issued in a corresponding Chinese Application No. 201080013313.0 with partial English translation.

* cited by examiner

US 8,546,030 B2

HYDROGEN GENERATOR, FUEL CELL SYSTEM COMPRISING HYDROGEN GENERATOR, AND OPERATION METHOD OF HYDROGEN GENERATOR, AND OPERATION METHOD OF FUEL CELL SYSTEM

This is a continuation application under 35 U.S.C 111(a) of pending prior International application No. PCT/JP2010/002071, filed on Mar. 24, 2010.

TECHNICAL FIELD

The present disclosure relates to a hydrogen generator, a fuel cell system including the hydrogen generator, an operation method of the hydrogen generator, and an operation method of the fuel cell system.

DESCRIPTION OF THE RELATED ART

Conventionally, a fuel cell system which is capable of high-efficient and small-scale power generation can easily construct a system for utilizing a heat energy generated during the power generation, and therefore has been developed as a distributed power generation system which can achieve a high energy utilization efficiency.

In the fuel cell system, during the power generation, a hydrogen-containing gas and an oxygen-containing gas are supplied to a fuel cell which is installed as a power generating section. In the fuel cell, a predetermined electrochemical reaction occurs using hydrogen contained in the hydrogen-containing gas and oxygen contained in the oxygen-containing gas which are supplied to the fuel cell. With the progress of the electrochemical reaction, the chemical energy of the hydrogen and the oxygen is directly converted into an electric energy in the fuel cell. The fuel cell system outputs an electric power to a load.

Typically, a supplier of the hydrogen-containing gas required during a power generation operation of the fuel cell system is not established as an infrastructure. For this reason, the conventional fuel cell system includes a reformer for generating the hydrogen-containing gas required during the power generation operation. In the reformer, the reforming catalyst facilitates a steam reforming reaction between a raw material such as a gas containing an organic compound, for example, a material gas containing a methane gas as a major component, and water, thereby generating the hydrogen-containing gas. In this case, the reforming catalyst in the reformer is heated by a heater up to a temperature which is suitable for the progress of the steam reforming reaction. The heater combusts a gas mixture of, for example, the material gas and air, to heat the reforming catalyst in the reformer. In addition, during the power generation of the fuel cell, etc, the heater combusts a fuel off-gas which remains unconsumed in the fuel cell.

To reduce the energy loss and improve the reforming efficiency, a water evaporator is provided within the reformer to evaporate the water used in the steam reforming reaction in the reformer. The hydrogen-containing gas generated in the reformer generally contains carbon monoxide which will poison a catalyst contained in the fuel cell. This makes it difficult to carry out the power generation correctly in the fuel cell. To avoid this, a shift converter for performing a shift reaction and a CO remover for performing selective oxidation are typically provided to reduce a carbon monoxide concentration of the hydrogen-containing gas generated in the reformer.

At the shutdown of the fuel cell system configured as described above, a portion of the fuel cell system which is connected to outside components is sealed to prevent leakage of a combustible gas such as a material gas or the hydrogen-containing gas from the hydrogen generator or the fuel cell. The catalysts such as the reforming catalyst, a shift catalyst, and a selective oxidation catalyst, which are included within the hydrogen generator, would deteriorate, cannot maintain high performance, and would degrade its durability, if they are in contact with an oxidizing gas under high-temperature conditions. Therefore, it is important to seal the fuel cell system to prevent outside air and others from entering the fuel cell system. On the other hand, if the fuel cell system continues to be completely sealed from the outside, the fuel cell system is placed under an excessively pressurized state or a negative-pressure state, due to a decrease in a temperature of the fuel cell system, etc.

To solve the above mentioned problem, there is known a method of stopping a reforming apparatus, in which a valve for sealing the reforming apparatus is controlled to allow the reforming apparatus to open to the atmosphere for depressurization of the reforming apparatus (e.g., see Japanese Laid-Open Patent Application Publication No. 2007-254251). In the method of stopping the reforming apparatus disclosed in Patent document 1, when the pressure in the reforming apparatus reaches a value which is not lower than a predetermined value, the valve is opened to depressurize the reforming apparatus, thereby reducing the pressure of the steam which is generated in the evaporator in the reforming apparatus and applied to the reforming apparatus. In this way, degradation of durability of the reforming apparatus can be prevented.

However, in the method of stopping the reforming apparatus disclosed in the above Patent document, even in a situation where the pressure in the reforming apparatus is lower than the predetermined value, the pressure in the reforming apparatus is in some cases higher than the supply pressure of the material gas depending on the magnitude of the predetermined value or the timing when the material gas is supplied. In these cases, there is a chance that the steam and liquid water remaining in the interior of the reforming apparatus will outflow and clog a material gas supply passage.

SUMMARY OF THE DISCLOSURE

The present disclosure has been made in an effort to address the foregoing problems, and an object of the present disclosure is to provide a hydrogen generator which suppress a steam or liquid water from outflowing from the hydrogen generator when the supply of a material gas to the hydrogen generator is resumed after the supply of the material gas and water is stopped and the hydrogen generator is sealed, and a fuel cell system comprising the hydrogen generator.

To achieve the above mentioned object, a 1st aspect of a hydrogen generator comprises: a reformer configured to generate a hydrogen-containing gas through a reforming reaction in an internal space thereof using a material gas and steam; a material gas supply passage through which the material gas is supplied to the reformer; a material gas supplier which is provided at the material gas supply passage to supply the material gas to the reformer; a first valve configured to open and close the material gas supply passage; an evaporator configured to generate a steam supplied to the reformer; a water supplier configured to supply water to the evaporator; a communicating passage for allowing the reformer to communicate with atmosphere; a second valve configured to open and close the communicating passage; and a controller configured to: stop the material gas supplier and the water supplier and close the first valve and the second valve at shutdown of the hydrogen generator; and open the second valve prior to opening of the first valve when the material gas supplier resumes supply of the material gas to the reformer after the shutdown.

In a 2nd aspect of the hydrogen generator, the controller may be configured to open the second valve prior to opening of the first valve in a purge process for purging at least a gas remaining in the reformer with the material gas.

In a 3rd aspect of the hydrogen generator, the controller may be configured to open the second valve prior to opening of the first valve, in a pressure compensation process for setting a pressure in a passage within the hydrogen generator to a positive pressure relative to an atmospheric pressure.

A 4th aspect of the hydrogen generator may further comprise a combustor configured to combust a combustible gas exhausted from the reformer and exhaust a combustion exhaust gas to atmosphere. The communicating passage may be connected to the combustor.

In a 5th aspect of the hydrogen generator, the controller may be configured to open the second valve prior to opening of the first valve, when the combustor starts combusting the combustible gas in a start-up process of the hydrogen generator.

In a 6th aspect of the hydrogen generator, the second valve may be provided upstream of the reformer.

A 7th aspect of the hydrogen generator may further comprise a water tank configured to open to atmosphere, and the communicating passage may be connected to the water tank.

A 8th aspect of the hydrogen generator may further comprise a deodorizer provided at the material gas supply passage to remove an odor component contained in the material gas. The first valve may be provided at a portion of the material gas supply passage which is located downstream of the deodorizer.

A 9th aspect of the hydrogen generator may further comprise: a combustor configured to combust a combustible gas exhausted from the reformer and exhaust a combustion exhaust gas to atmosphere; and an air supplier configured to supply combustion air to the combustor. The communicating passage may be configured to include or be connected to a combustion exhaust gas passage through which combustion exhaust gas exhausted from the combustor flows. The controller may be configured to operate the air supplier in a state where the second valve is opened prior to opening of the first valve.

In a 10th aspect of the hydrogen generator, preferably the controller may be configured to operate the air supplier prior to opening of the second valve.

A 11th aspect of the hydrogen generator may further comprise an ignition device which is provided in the combustor. The controller may be configured to open the first valve and operate the ignition device, after the air supplier starts supply of the air, in a purge process or a start-up process for the hydrogen generator.

In a 12th aspect of the hydrogen generator, the controller may be configured to close the second valve and open the first valve, after the air supplier starts supply of the air, in a pressure compensation process for setting a pressure in a passage within the hydrogen generator to a positive pressure relative to an atmospheric pressure.

A 1st aspect of a fuel cell system comprises the above mentioned hydrogen generator; and a fuel cell configured to generate an electric power using a hydrogen-containing gas supplied from the hydrogen generator.

A 2nd aspect of the fuel cell system may further comprise a combustor and an air supplier; the combustor being configured to combust an off-gas exhausted from an anode of the fuel cell and the air supplied from the air supplier. The communicating passage may be configured to include or be connected to a combustion exhaust gas passage through which combustion exhaust gas exhausted from the combustor flows. The controller may be configured to set an operation amount of the air supplier in a state where the second valve is opened larger than an operation amount of the air supplier in an state where the fuel cell is generating a maximum electric power.

A 3rd aspect of the fuel cell system may further comprise: an oxidizing gas supplier configured to supply the oxidizing gas to the fuel cell; and an oxidizing gas exhaust passage through which the oxidizing gas exhausted from the fuel cell flows. The communicating passage may be configured to include or be connected to the oxidizing gas exhaust passage. The controller may be configured to operate the oxidizing gas supplier in a state where the second valve is opened prior to opening of the first valve.

A 1st aspect of a method of operating a hydrogen generator comprises at shutdown of the hydrogen generator, a step (A) for stopping supply of a material gas from a material gas supplier to a reformer via a material gas supply passage; a step (B) for stopping supply of water from a water supplier to an evaporator; a step (C) for closing the material gas supply passage using a first valve; a step (D) for closing a communicating passage for allowing the reformer to communicate with atmosphere, using a second valve; and a step (E) for opening the second valve prior to opening of the first valve, when the material gas supplier resumes supply of the material gas to the reformer, after performing the step (A) to step (D).

In a 2nd aspect of the method of operating the hydrogen generator , in the step (E), the second valve may be opened prior to opening of the first valve in a purge process for purging at least a gas in the reformer with the material gas.

In a 3rd aspect of the method of operating the hydrogen generator , in the step (E), the second valve may be opened prior to opening of the first valve, in a pressure compensation process for setting a pressure in a passage within the hydrogen generator to a positive pressure relative to an atmospheric pressure.

In a 4th aspect of the method of operating the hydrogen generator, the hydrogen generator may include a combustor configured to combust a combustible gas exhausted from the reformer and exhaust a combustion exhaust gas to atmosphere; and the communicating passage may be connected to the combustor.

In a 5th aspect of the method of operating the hydrogen generator, in step (E), the second valve may be opened prior to opening of the first valve, when the combustor starts combustion at start-up of the hydrogen generator.

In a 6th aspect of the method of operating the hydrogen generator, the hydrogen generator may include a deodorizer provided at the material gas supply passage to remove an odor component contained in the material gas; and the first valve may be provided at a portion of the material gas supply passage which is located downstream of the deodorizer.

In a 7th aspect of the method of operating the hydrogen generator, the hydrogen generator may include a combustor configured to combust a combustible gas exhausted from the reformer and exhaust a combustion exhaust gas to atmosphere; and an air supplier configured to supply combustion air to the combustor, the communicating passage may be configured to include or be connected to a combustion exhaust gas passage through which combustion exhaust gas exhausted from the combustor flows; and the method may further comprise a step (F) for operating the air supplier in a state where the second valve is opened prior to opening of the first valve.

A 1st aspect of a method of operating a fuel cell system, including a hydrogen generator including a reformer configured to generate a hydrogen-containing gas through a reforming reaction in an internal space thereof using a material gas and steam; a material gas supply passage through which the material gas is supplied to the reformer; a material gas supplier which is provided at the material gas supply passage to supply the material gas to the reformer; a first valve configured to open and close the material gas supply passage; an evaporator configured to generate a steam supplied to the reformer; a water supplier configured to supply water to the evaporator; a communicating passage for providing communication between the reformer and atmosphere; a second valve configured to open and close the communicating passage; and a fuel cell; the method comprising: at shut-down of the fuel cell system, step (A) for stopping supply of the material gas from the material gas supplier to the reformer via the material gas supply passage; step (B) for stopping supply of water from the water supplier to the evaporator; step(C) for closing the material gas supply passage using the first valve; and step (D) for closing a communicating passage for providing communication between the reformer and atmosphere via an oxidizing gas exhaust passage through which the oxidizing gas exhausted from the fuel cell flows, using the second valve; the method further comprising: step (E) for opening the second valve prior to opening of the first valve when supply of the material gas from the material gas supplier to the reformer resumes, after the step (A)~step (D).

In a 2nd aspect of the method of the fuel cell system, in step (E), the second valve may be opened prior to opening of the first valve and the oxidizing gas supplier configured to supply the oxidizing gas to the fuel cell may operate.

The above and further objects, features and advantages of the disclosure will be more fully apparent from the following detailed description with reference to the accompanying drawings.

DETAILED DESCRIPTION OF THE PREFERRED EMBODIMENTS

Figure 1:
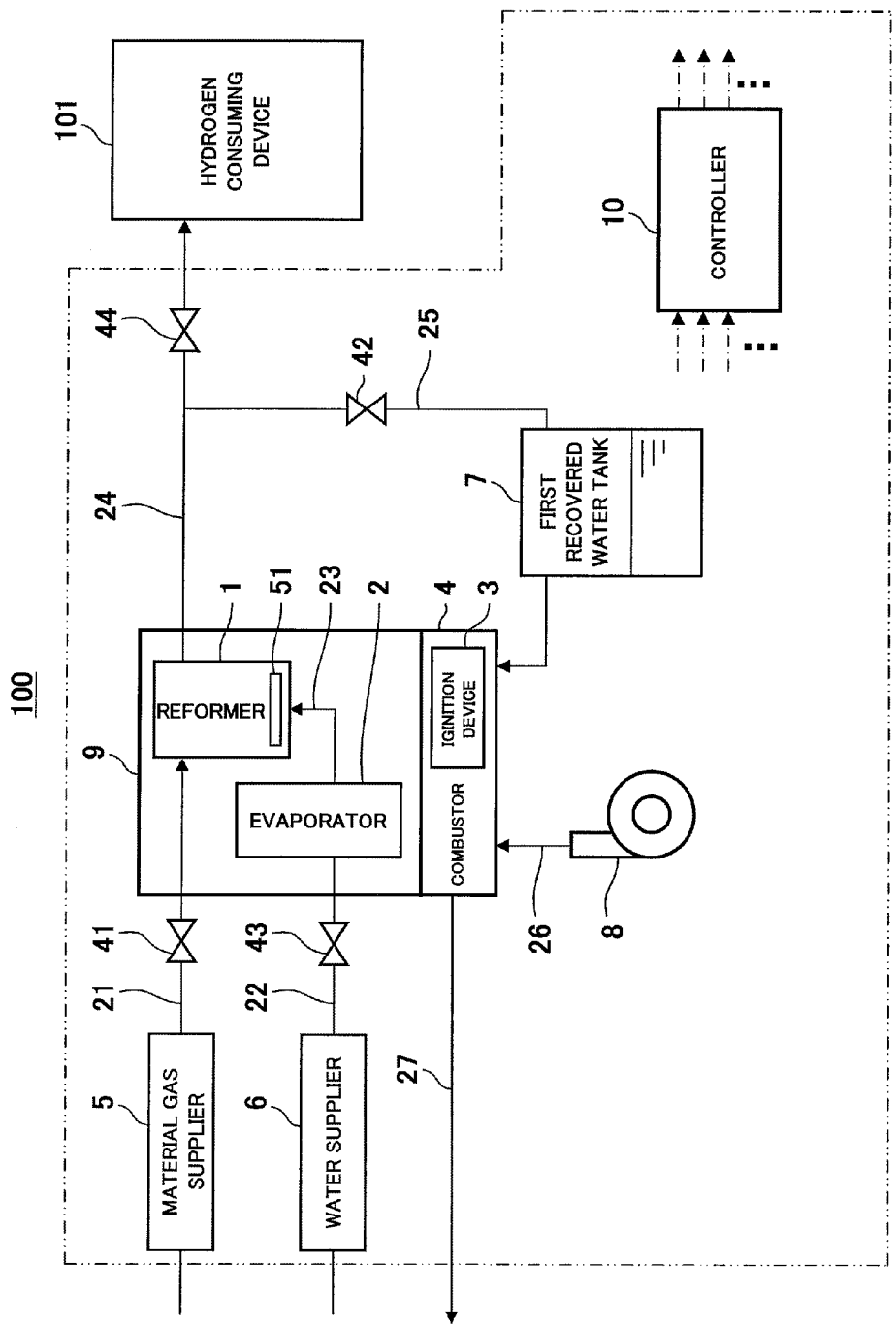
FIG. 1 is a schematic view of an exemplary configuration of a hydrogen generator according to Embodiment 1 of the present disclosure.

Hereinafter, preferred embodiments of the present disclosure will be described with reference to the accompanying drawings. Throughout the drawings, the same or corresponding constituents are designated by the same reference numerals, and repetitive description will be omitted. In addition, throughout the drawings, only the constituents required to describe the disclosure are illustrated, but other constituents are omitted. It should be noted that the present disclosure is not limited to Embodiments described below.

A hydrogen generator according to the present disclosure includes a reformer configured to generate a hydrogen-containing gas through a reforming reaction using a material gas and a steam in an internal space thereof, a material gas supply passage through which the material gas is supplied to the reformer, a material gas supplier which is provided at the material gas supply passage to supply the material gas to the reformer, a first valve configured to open and close the material gas supply passage, an evaporator configured to generate a steam supplied to the reformer, a water supplier configured to supply water to the evaporator, a communicating passage for allowing the reformer to communicate with atmosphere, a second valve configured to open and close the communicating passage, and a controller configured to stop the material gas supplier and the water supplier and to close the first valve and the second valve at the time of shutdown of the hydrogen generator and to thereafter open the second valve prior to opening of the first valve, when the material gas supplier resumes the supply of the material gas to the reformer.

As used herein, the "material gas" is meant to include gases which are used with the steam to generate the hydrogen-containing gas in the reforming reaction. The material gases include, for example, but are not limited to, hydrocarbon, such as ethane and propane, or gases containing organic compounds composed of at least carbon and hydrogen, such as a gas containing gaseous alcohol.

The "material gas supplier" may be configured as desired, so long as it is capable of supplying the material gas with a controlled flow rate. For example, the material gas supplier may be constituted by, for example, but not limited to, a single flow control valve or a single booster, or otherwise a combination of a booster pump and the flow control valve.

The phrase "first valve configured to open and close the material gas supply passage" means that a valve is configured to be opened and closed to permit and inhibit, respectively, the flow of the material gas in the material gas supply passage. As the first valve, an on-off valve such as an electromagnetic valve may be used.

The "water supplier" may be configured as desired, so long as it is capable of supplying the water to the evaporator with a controlled flow rate. The water supplier may be constituted, for example, but not limited to, by a single flow valve, a single pump or a combination of the pump and the flow control valve.

The "communicating passage" may be configured to provide communication between the reformer and atmosphere and is defined as at least a portion of a passage extending from the reformer to atmosphere. To be specific, the communicating passage may be a fuel gas supply passage 24 in FIG. 1, a bypass passage 25 in FIG. 1, passages connected to a combustor 4 and to a combustion exhaust gas passage 27 in FIG. 1, and a depressurization passage 28 in FIGS. 8 and 9, which will be described later. Devices (e.g., combustor 4) may be provided at the passages forming the communicating passage. In other words, the communicating passage may be configured to allow the reformer to directly or indirectly communicate with atmosphere.

The phrase "second valve configured to open and close the communicating passage" means that a valve is configured to be opened and closed to permit and inhibit, respectively, the flow of the gases such as the steam in the communicating passage. As the second valve, an on-off valve such as an electromagnetic valve may be used.

The "controller" is configured to control the material gas supplier, the water supplier, the first valve and the second valve in the above described manner. The "controller" may be constituted by, for example, but not limited to, a microcomputer, a logic circuit, etc. The "controller" is meant to include a controller group consisting of plural controllers configured to cooperate with each other to control the hydrogen generator, as well as a single controller. Therefore, the "controller" need not be constituted by the single controller but may be constituted by plural controllers which are distributed to cooperate with each other to control the hydrogen generator.

The phrase "open the second valve prior to opening of the first valve" means that the controller outputs an open operation command to the second valve prior to outputting of an open operation command to the first valve. In other words, the phrase "open the second valve prior to opening of the first valve" means that the open operation of the first valve is performed after the open operation of the second valve is performed.

The phrase "depressurize the hydrogen generator" means that when the pressure in the hydrogen generator is higher than an atmospheric pressure, its internal pressure is reduced by releasing it into atmosphere.

In accordance with the above configuration, if the pressure in the hydrogen generator is higher than the supply pressure of the material gas when the supply of the material gas is resumed, its internal pressure is released into atmosphere in advance. This reduces the chance that steam or liquid water will outflow from the hydrogen generator and clog the material gas supply passage.

Hereinafter, embodiments of the present disclosure will be described in detail with reference to the accompanying drawings.

(Embodiment 1)

In Embodiment 1 of the present disclosure, an exemplary configuration in which the communicating passage is a passage through which a gas exhausted from the reformer flows and an exemplary operation at the shutdown of the hydrogen generator will be described.

The hydrogen generator according to Embodiment 1 includes a combustor configured to combust a combustible gas exhausted from the reformer and to exhaust the resulting combustion exhaust gas to atmosphere. The communicating passage is connected to the combustor. The combustor is configured to communicate with atmosphere through a combustion exhaust gas passage through which the combustion exhaust gas generated in the combustor is exhausted to outside the hydrogen generator, in normal cases.

In this configuration, if the pressure in the hydrogen generator is higher than an atmospheric pressure, the second valve is opened to release the gas from the hydrogen generator, thereby decreasing the pressure in the hydrogen generator.

The hydrogen generator of Embodiment 1 includes an air supplier configured to supply combustion air to the combustor. The controller is configured to operate the air supplier in the state where the second valve is opened prior to opening of the first valve.

In such a configuration, when the second valve is opened to depressurize the hydrogen generator, the combustible gas which may be contained in the gas flowing into the combustor, is diluted by the air supplied from the air supplier and exhausted to outside the hydrogen generator.

In the above described control, the controller is desirably configured to operate the air supplier prior to opening of the second valve.

Thus, even when the gas containing the combustible gas flows from the hydrogen generator into the combustor immediately after opening of the second valve, the combustible gas is diluted by the air supplied from the air supplier and exhausted to outside the hydrogen generator.

In the hydrogen generator of Embodiment 1, the controller is configured to open the second valve prior to opening of the first valve, when performing a purge process for purging at least the gas in the interior of the reformer using the material gas.

In such a configuration, the hydrogen generator is depressurized before the supply of the material gas to the hydrogen generator is resumed to perform the purge process, thereby reducing the chance that steam or liquid water will outflow from the hydrogen generator and clog the material gas supply passage.

In the hydrogen generator of Embodiment 1, the controller is configured to open the first valve and to operate an ignition device after the air is supplied from the air supplier, when performing the purge process for the hydrogen generator.

The phrase "open the first valve and operate the ignition device" means that the opening of the first valve and the start of the operation of the ignition device occur at the same timing or different timings.

[Configuration of Hydrogen Generator]

FIG. 1 is a schematic view of an exemplary configuration of a hydrogen generator according to Embodiment 1 of the present disclosure.

Referring to FIG. 1, a hydrogen generator 100 of Embodiment 1 is configured to supply a hydrogen-containing gas to a hydrogen consuming device 101, The hydrogen consuming device 101 may be, for example, but not limited to, a hydrogen tank or a fuel cell.

The hydrogen generator 100 includes a hydrogen generating section 9. The hydrogen generating section 9 includes therein a reformer 1, an evaporator 2, and a combustor 4. The hydrogen generating section 9 supplies the hydrogen-containing gas generated in the reformer 1 to the hydrogen consuming device 100, as a fuel gas. The hydrogen consuming device 101 may be, but is not limited to a hydrogen storage vessel. Any other suitable devices adapted to consume hydrogen, for example, a fuel cell, may be used as the hydrogen consuming device 101.

A water supply passage 22 is connected to the evaporator 2. A water supplier 6 is provided at the water supply passage 22.

The inlet of the water supplier 6 is connected to, for example, a tap water pipe or a tap water faucet (not shown). The water supplier 6 supplies the water (herein, tap water) to the evaporator 2 through the water supply passage 22. A third valve 43 is provided in the water supply passage 22 and is controlled to be opened and closed so as to open and close the water supply passage 22. The evaporator 2 is connected to the reformer 1 through a steam supply passage 23. The evaporator 2 evaporates the water supplied from the water supplier 6 into steam and supplies the steam to the reformer 1.

Although the water supplier 6 is configured to supply the tap water to the evaporator 2 in this Embodiment, cooling water for use in the fuel cell, etc may alternatively be supplied to the evaporator 2, when the hydrogen consuming device 101 is, for example, the fuel cell. In this embodiment, the water supplier 6 is constituted by, for example, a flow control valve for controlling the flow of water. The third valve 43 may be constituted by, for example, an on-off valve such as an electromagnetic valve or a flow control valve.

A material gas supply passage 21 is connected to the reformer 1. A material gas supplier 5 is provided at the material gas supply passage 21. The upstream end of the material gas supplier 5 in a flow direction of the material gas is connected to a material gas source such as a pipe or faucet of a city gas infrastructure (not shown). The material gas supplier 5 supplies the material gas such as, but not limited to, a city gas containing methane as a major component to the reformer 1 through the material gas supply passage 21. A first valve 41 is provided in the material gas supply passage 21 and is controlled to be opened and closed so as to open and close the material gas supply passage 21. The first valve 41 is an example of the "first valve." Note that a deodorizer may be provided at the material gas supply passage 21.

A reforming catalyst (not shown) is provided in the internal space of the reformer 1. The material gas supplied from the material gas supplier 5 and the steam supplied from the evaporator 2 react with each other in a steam reforming process, to generate the hydrogen-containing gas. The reformer 1 is provided with a temperature sensor 51, which detects the temperature of the interior of the reformer 1 and outputs a detection signal to the controller 10.

The fuel gas generated in the hydrogen generator 100 is supplied to the hydrogen consuming device 101 through a fuel gas supply passage 24. As will be described later, the fuel gas supply passage 24 is a part of the "communicating passage." In this Embodiment, the hydrogen generating section 9 is configured to exhaust the hydrogen-containing gas generated in the reformer 1 without treating the gas. Alternatively, a shift converter for reducing carbon monoxide contained in the hydrogen-containing gas generated in the reformer 1, through a shift reaction, or a CO remover for reducing the carbon monoxide, through oxidation, may be provided downstream of the reformer 1.

A fourth valve 44 is provided in the fuel gas supply passage 24 and is controlled to be opened and closed so as to open and close the fuel gas supply passage 24. The upstream end of a bypass passage 25 is connected to a portion of the fuel gas supply passage 24 which is located upstream of the fourth valve 44, while the downstream end thereof is connected to the combustor 4. A portion of the fuel gas supply passage 24 which is located upstream of a junction where the fuel gas supply passage 24 is joined to the upstream end of the bypass passage 25, and the bypass passage 25, form the "communicating passage." A second valve 42 is provided in the bypass passage 25 and is controlled to be opened and closed so as to open and close the bypass passage 25. The second valve 42 is an example of a "second valve." A first recovered water tank 7 is provided at a portion of the bypass passage 25 which is located downstream of the second valve 42. The gas-liquid separator 7 is configured to condense the steam in the gas flowing in the fuel gas supply passage 24 and the bypass passage 25 into water and to separate the water from the gas. The separated water is stored in a tank of the first recovered water tank 7. As the second valve 42 or the fourth valve 44, an on-off valve such as an electromagnetic valve, or a flow control valve for controlling the flow rate may be used.

An air supplier 8 is connected to the combustor 4 through a combustion air supply passage 26. The air supplier 8 is configured to supply combustion air to the combustor 4. As the air supplier 8, for example, a blower, or a fan such as a sirocco fan, may be used. The combustor 4 is provided with an ignition device 3. The ignition device 3 is configured to ignite the combustion gas and the air. As the ignition device 3, for example, an igniter may be used.

In the combustor 4, the ignition device 3 ignites a gas containing the combustible gas such as the hydrogen gas exhausted from the reformer 1 through the bypass passage 25 or the material gas, and the air supplied from the air supplier 8 to combust them, thereby generating the combustion exhaust gas. The heat of the combustion exhaust gas is transferred to the components such as the reformer 1 and the evaporator 2 to heat them. The combustion exhaust gas is exhausted to outside the hydrogen generator 100, i.e., to atmosphere, through the combustion exhaust gas passage 27.

The hydrogen generator 100 includes a controller 10 which is an example of the controller. The controller 10 is constituted by, for example, but not limited to, a microprocessor and is configured and programmed so as to control the hydrogen generator 100.

[Operation of Hydrogen Generator]

An exemplary operation of the hydrogen generator 100 according to Embodiment 1 will be described with reference to FIGS. 1 to 3. In this operation, a purge process (purge operation) for purging at least the gas in the interior of the reformer 1 is performed, as will be described later. The hydrogen generator 100 operates as follows under control of the controller 10. The following operation is an example in which the second valve 42 is opened prior to opening of the first valve 41, in the purge process.

Figure 2:
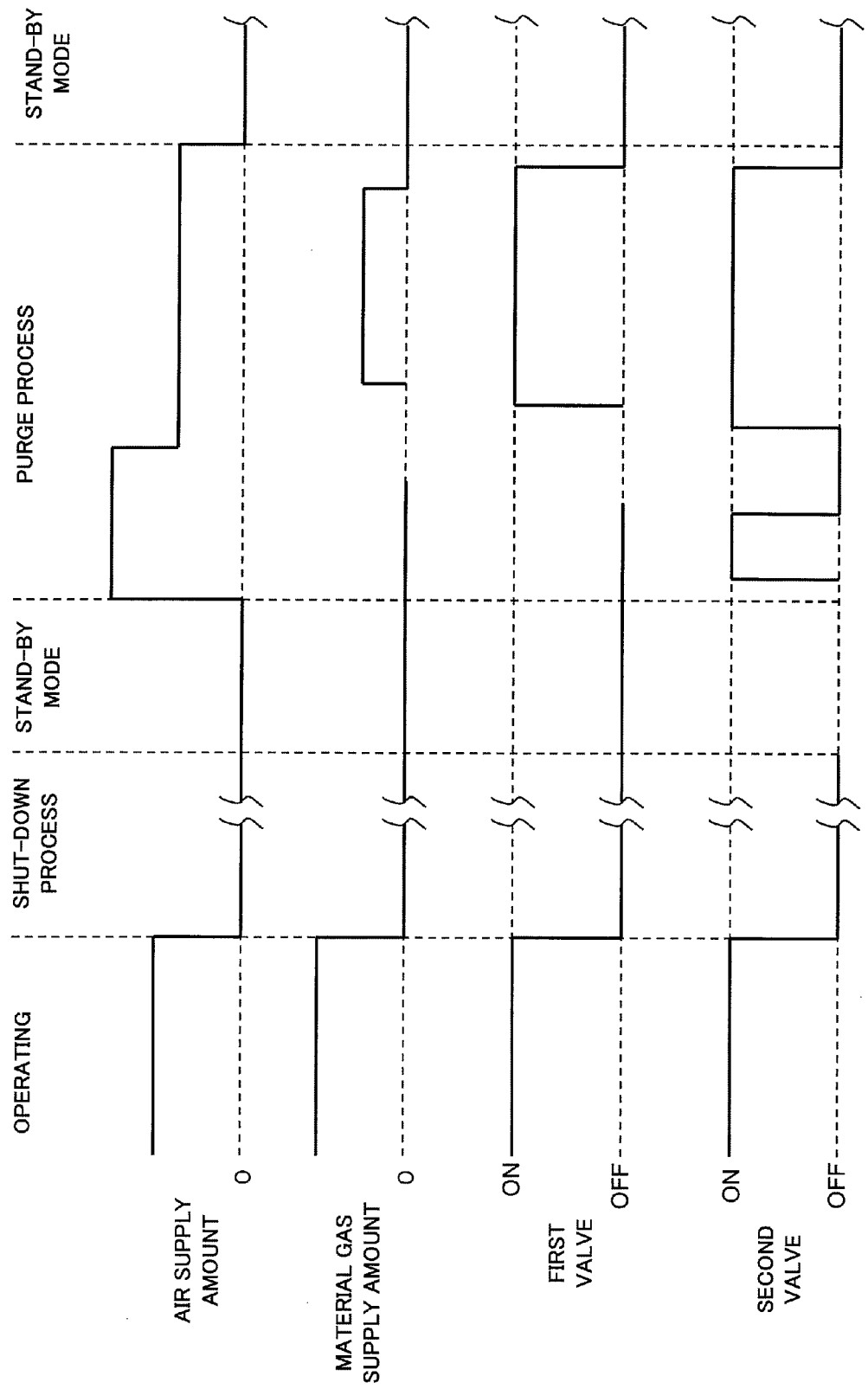
FIG. 2 is a timing chart of the operation performed at the time of shutdown of the hydrogen generator according to Embodiment 1.

FIG. 2 is a timing chart of the operation performed at the time of shutdown of the hydrogen generator 100 according to Embodiment 1. FIG. 3 is a flowchart showing an exemplary operation performed at the time of shutdown of the hydrogen generator 100 according to Embodiment 1.

It is assumed that the hydrogen generator 100 is under a rated operation state, in which the hydrogen generator 100 is stably supplying a maximum amount of hydrogen within its capability during the operation for supplying hydrogen in the hydrogen generator 100. For example, upon a user entering a shutdown operation request, the controller 10 outputs a shutdown command.

Figure 3:
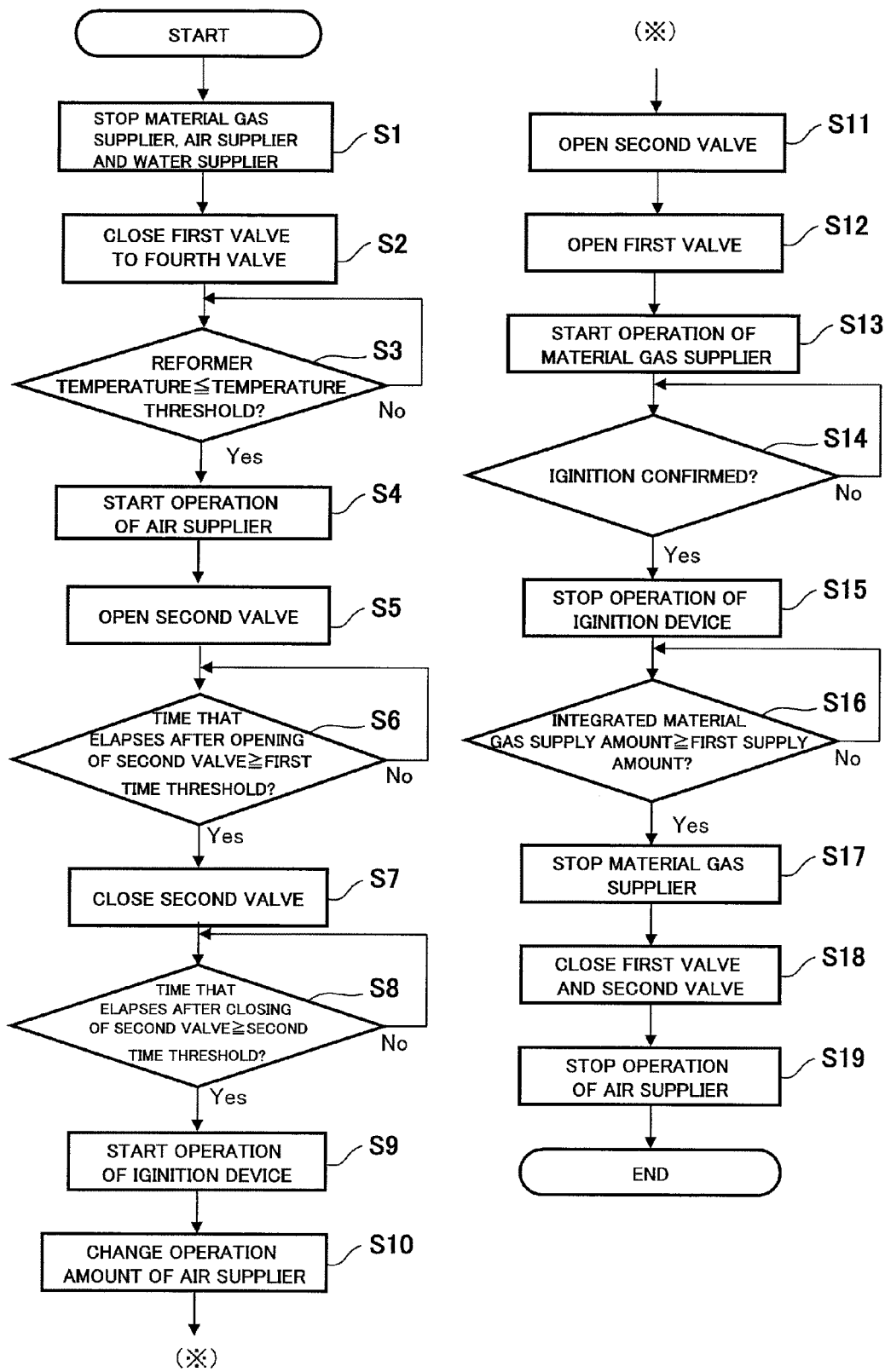
FIG. 3 is a flowchart showing an exemplary operation performed at the time of shutdown of the hydrogen generator according to Embodiment 1.

In response to this, as shown in FIGS. 2 and 3, the combustor 4, the material gas supplier 5 and the water supplier 6 stop their operations to stop the operation for generating the hydrogen-containing gas in the hydrogen generator 100 (step S1), and the first to fourth valves 41~44 are closed (step S2). Thereby, the supply of the material gas and the supply of the water to the hydrogen generator 100 stop and the combustion of the fuel gas and the air in the combustor 4 stops. Since the first to fourth valves 41~44 are closed, at least the passages connected with the reformer 1 within the hydrogen generating section 9 are disconnected with atmosphere and placed in a sealed state (sealing operation of the hydrogen generator 100). Thereafter, a predetermined shutdown operation is performed, and a shutdown process is completed. The hydrogen generator 100 transitions to a stand-by mode in which the hydrogen generator 100 is awaiting the next start-up.

As used herein, "shutdown process" refers to the operation performed from when the controller 10 outputs the shutdown command until the hydrogen generator 100 has completed the shutdown process. After the hydrogen generator 100 has completed the shutdown process, the controller 10 is operating. When a start-up request is generated, the controller 10 outputs a start-up command, and the hydrogen generator 100 quickly transitions to the stand-by mode in which the hydrogen generator 100 is ready to start the start-up process. As used herein, the phrase "start-up request is generated" is meant to include a case where a request for starting the operation is entered with an operation device such as a remote controller, a case where it is determined that the hydrogen is required to be supplied to the hydrogen consuming device 101, etc.

Then, under a state where the reformer 1 is cooled naturally, the controller 10 detects the temperature of the reformer 1 using the temperature sensor 51 and determines whether or not the detected temperature is not higher than a predetermined temperature threshold (step S3). The temperature threshold is defined as a temperature which is not higher than an upper limit temperature at which carbon is deposited from the material gas in the reformer 1, in view of a temperature increase caused by combusting the combustible gas in the combustor 4 in the purge process described later.

If it is determined that the temperature detected by the temperature sensor 51 is not higher than the temperature threshold (Yes in step S3), the controller 10 starts the operation of the air supplier 8 (step S4). In this case, as shown in FIG. 2, the controller 10 controls the air supplier 8 so that the operation amount of the air supplier 8 is larger than the operation amount of the air supplier 8 during the rated operation of the hydrogen generator 100, i.e., the air is supplied to the combustor 4 with a larger amount than in the case where the air is supplied to the combustor 4 during the rated operation of the hydrogen generator 100. Then, the controller 10 opens the second valve 42 (step S5).

If the pressure in the hydrogen generator 100 before opening of the second valve 42 is higher than an atmospheric pressure, the pressure in the hydrogen generator 100 is released into the atmosphere via the combustor 4. This reduces the chance that the steam or liquid water will outflow from the hydrogen generator 100 and clog the material gas supply passage 21 when the first valve 41 is opened to start the supply of the material gas for performing the purge process. The air is supplied from the air supplier 8 to the combustor 4 prior to opening of the second valve 42. Therefore, if the gas containing the combustible gas flows into the combustor 4 immediately after opening of the second valve 42, it can be diluted by the air supplied from the air supplier 8.

Although the air supplier 8 is operated prior to opening of the second valve 42 in Embodiment 1, the operation of the air supplier 8 is not limited to this, as the air supplier 8 may be operated at the same time that the second valve 42 is opened, or after the second valve 42 is opened. With such control, the level to which the combustible gas contained in the gas flowing into the combustor 4 immediate after opening of the second valve 42 is diluted is lower than the level achieved by the control for operating the air supplier 8 prior to opening of the second valve 42. But, even with such control, the gas flowing into the combustor 4 after starting of the air supply operation can be diluted adequately and exhausted to outside the hydrogen generator 100.

Then, the controller 10 obtains a time that elapses from when the second valve 42 is opened. If it is determined that the time is not shorter than a first time threshold (Yes in step S6), the controller 10 closes the second valve 42 (step S7). The first time threshold is defined as a time period required to depressurize the hydrogen generator 100 by opening of the second valve 42, i.e., a time period that elapses until the pressure in the passages within the hydrogen generator 100 reaches a pressure which is not higher than the pressure in the portion of the material gas supply passage 21 which is located upstream of the first valve 41. The first time threshold is an exemplary threshold used to determine whether or not the pressure in the passage in the hydrogen generator 100 is not higher than at least the pressure in the portion of the material gas supply passage 21 which is located upstream of the first valve 41. For example, the pressure in the passage within the sealed hydrogen generator 100 may be directly detected, and the second valve 42 may be closed when the detected pressure is not higher than the pressure in the material gas supply passage 21.

Then, the controller 10 obtains a time that elapses after the second valve 42 is closed, and determines whether or not the time is not shorter than a second time threshold (step S8). The second time threshold is defined as a time period required to purge with air, the gas containing the combustible gas which flowed into the combustor 3 by opening of the second valve 42 and may probably remain therein after the second valve 42 is closed. The second time threshold is an exemplary threshold used to determine whether or not an integrated air supply amount of the air supplier 8 after closing of the second valve 42 is not less than the integrated air supply amount required for the purge. For example, the integrated air supply amount of the air supplier 8 may be directly detected and it may be determined whether or not the detected integrated air supply amount is not less than the air supply amount required for the purge.

If it is determined that the time that elapses after closing of second valve 42 is not shorter than the second time threshold (Yes in step S8), the controller 10 starts the operation of the ignition device 3 (step S9), and changes the operation amount of the air supplier 8 (step S10). To be specific, the controller 10 changes the operation amount of the air supplier 8 so that the air supply amount reaches an air amount with which the combustible gas can be combusted in the combustor 4. It should be noted that the order of step S9 and step S10 may be reversed.

Then, the controller 10 opens the second valve 42 (step S11). After that, the controller 10 opens the first valve 41 (step S12) and starts the operation of the material gas supplier 5 (step S13). Thereby, the material gas is supplied from the material gas supplier 5 to the passages within the hydrogen generator 100 including the reformer 1 and purges the gas such as the steam remaining in the passages within the hydrogen generator 10 (FP (Fuel processing) purge process). The purged gas is supplied to the combustor 4.

If it is determined that ignition has occurred in the combustor 4 using an ignition detector (not shown) (Yes in step S14), the controller 10 stops the operation of the ignition device 3 (step S15). Then, the controller 10 integrates the amount of the material gas supplied from the material gas supplier 5 to the passages within the hydrogen generator 100, and determines whether or not the integrated material gas supply amount is not less than a first supply amount (step S16). The first supply amount is defined as an integrated supply amount of the material gas required to purge at least the gas remaining in the reformer 1. The first supply amount is an exemplary determination threshold used to directly determine whether or not the integrated supply amount of the material gas reaches an integrated supply amount of the material gas which is able to purge at least the gases remaining in the reformer 1. For example, the integrated supply amount of the material gas may be indirectly determined in such a manner that a time that elapses from when the material gas supplier 5 starts operating and it is determined whether or not the detected time is not shorter than the integrated supply time of the material gas required for the purge.

If it is determined that the integrated material gas supply amount is not less than the first supply amount (Yes in step S16), the controller 10 stops the material gas supplier 5 (step S17), closes the first valve 41 and the second valve 42 (step S18), and stops the operation of the air supplier 8.

Although the purge process is performed in the stand-by mode of the hydrogen generator 100 in this Embodiment, the purge process may be performed as a part of the shutdown operation in the shutdown process. It should be noted that in this case, a cooling operation for supplying air from the air supplier 8 desirably continues until the temperature detected by the temperature sensor 51 reaches a temperature which is not higher than the above identified temperature threshold at which the purge process is allowed, for the purpose of quick accomplishment of the shutdown process.

In accordance with the hydrogen generator 100 of Embodiment 1, when the material gas supplier 5 resumes the supply of the material gas to the reformer 1 after the supply of the material gas and water is stopped to stop the operation for generating the hydrogen-containing gas in the hydrogen generator 100, and the sealing operation of the hydrogen generator 100 is carried out, the pressure in the hydrogen generator 100 is released into the atmosphere in advance even if the pressure in the hydrogen generator 100 is higher than the supply pressure of the material gas. This reduces the chance that the steam or liquid water will outflow from the hydrogen generator 100 and clog the material gas supply passage 21.

(Embodiment 2)

In Embodiment 2 of the present disclosure, an exemplary pressure compensation process of the hydrogen generator 100 will be described. The temperature of the hydrogen generator 100 decreases with time, after the sealing operation for the hydrogen generator 100 is carried out at the shutdown of the hydrogen generator 100 of Embodiment 1. With the temperature decrease, the pressure in the sealed hydrogen generator 100 decreases. As the decrease in the internal pressure progresses, an excessively negative pressure is generated in the interior of the hydrogen generator 100, which will undesirably lead to a situation where the constituents are damaged. To avoid this, the conventional hydrogen generator is configured to perform a pressure compensation process for feeding a gas to the interior of the hydrogen generator when the pressure in the hydrogen generator is not higher than a predetermined value which is higher than a negative pressure resistance limit value of the hydrogen generator.

However, even when it is determined that the pressure compensation process is required because of the temperature decrease, the water remaining in the hydrogen generator will be evaporated, thereby making the pressure in the sealed hydrogen generator higher than the supply pressure of the material gas, if the temperature of the hydrogen generator is not lowered to a sufficient level, for example, the temperature of the reformer or the evaporator is 100 degrees centigrade or higher. Under this condition, the steam or liquid water remaining in the hydrogen generator may outflow therefrom and clog the material gas supply passage, when the pressure compensation process is performed.

To solve this problem, in the hydrogen generator 100 of Embodiment 2, the controller 10 is configured to open the second valve 42 prior to opening of the first valve 41, when the pressure compensation process is performed for the sealed hydrogen generator 100. This reduces the chance that the steam or liquid water will outflow from the hydrogen generator 100 and clog the material gas supply passage 21.

As in the hydrogen generator 100 of Embodiment 1, in the hydrogen generator 100 of Embodiment 2, the controller 10 is configured to operate the air supplier 8 in the state where the second valve 12 is opened prior to opening of the first valve 41, in the pressure compensation process.

In such a configuration, if the gas flowing into the combustor 4 after opening of the second valve 42 contains the combustible gas, it is diluted by the air supplied from the air supplier 8 and exhausted to outside the hydrogen generator 100.

In this case, the controller 10 is desirably configured to operate the air supplier 8 prior to opening of the second valve 42. In such a configuration, if the gas flowing into the combustor 4 after opening of the second valve 42 contains the combustible gas, it is diluted by the air supplied from the air supplier 8 and exhausted to outside the hydrogen generator 100.

[Operation of Hydrogen Generator]

The operation of the hydrogen generator 100 of Embodiment 2 of the present disclosure will now be described. The hydrogen generator 100 of Embodiment 2 has basically the same configuration as that of the hydrogen generator 100 of Embodiment 1, and therefore detailed description thereof will be omitted.

Figure 4:
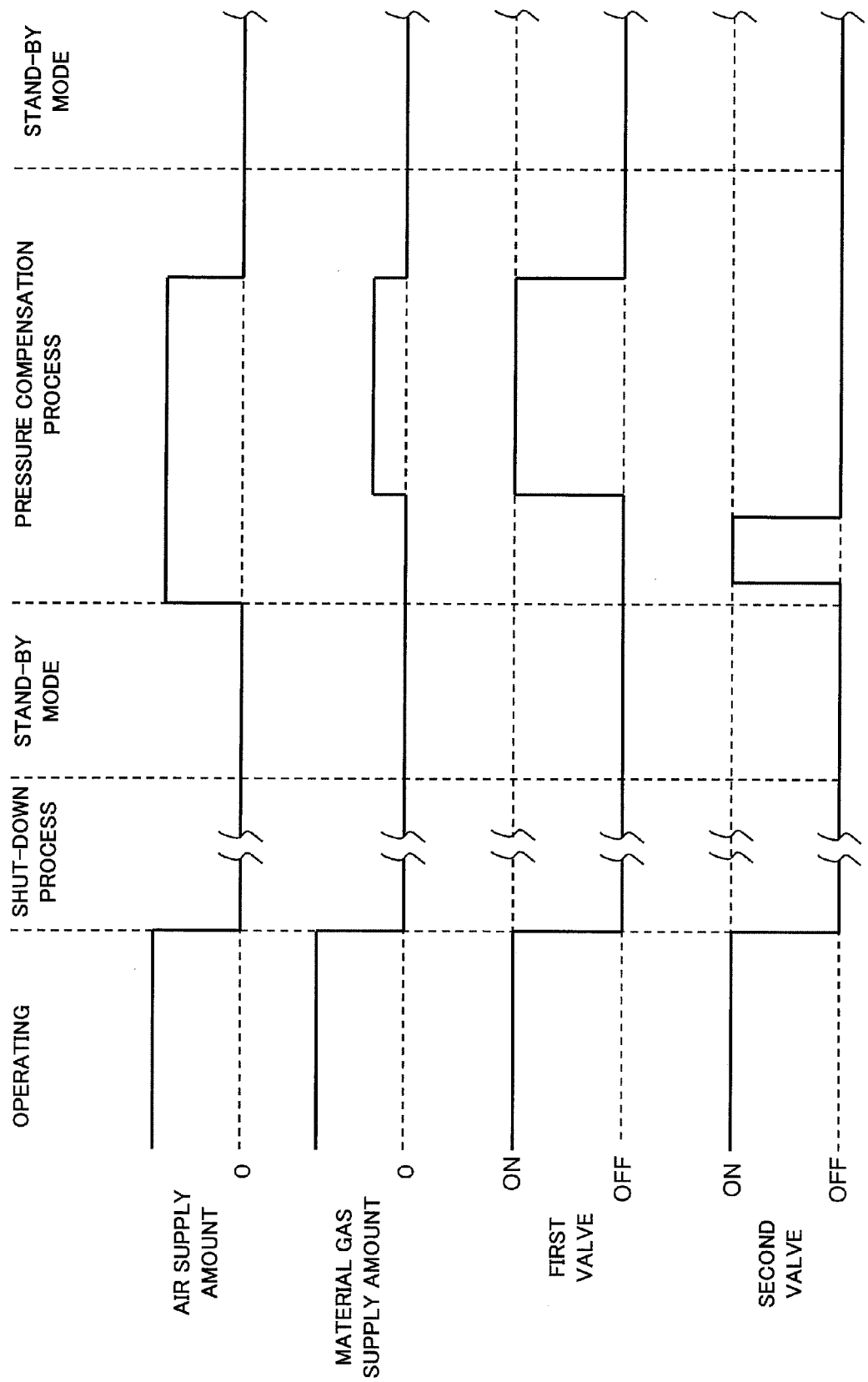
FIG. 4 is a timing chart of the operation performed at the time of shutdown of a hydrogen generator according to Embodiment 2.
Figure 5:
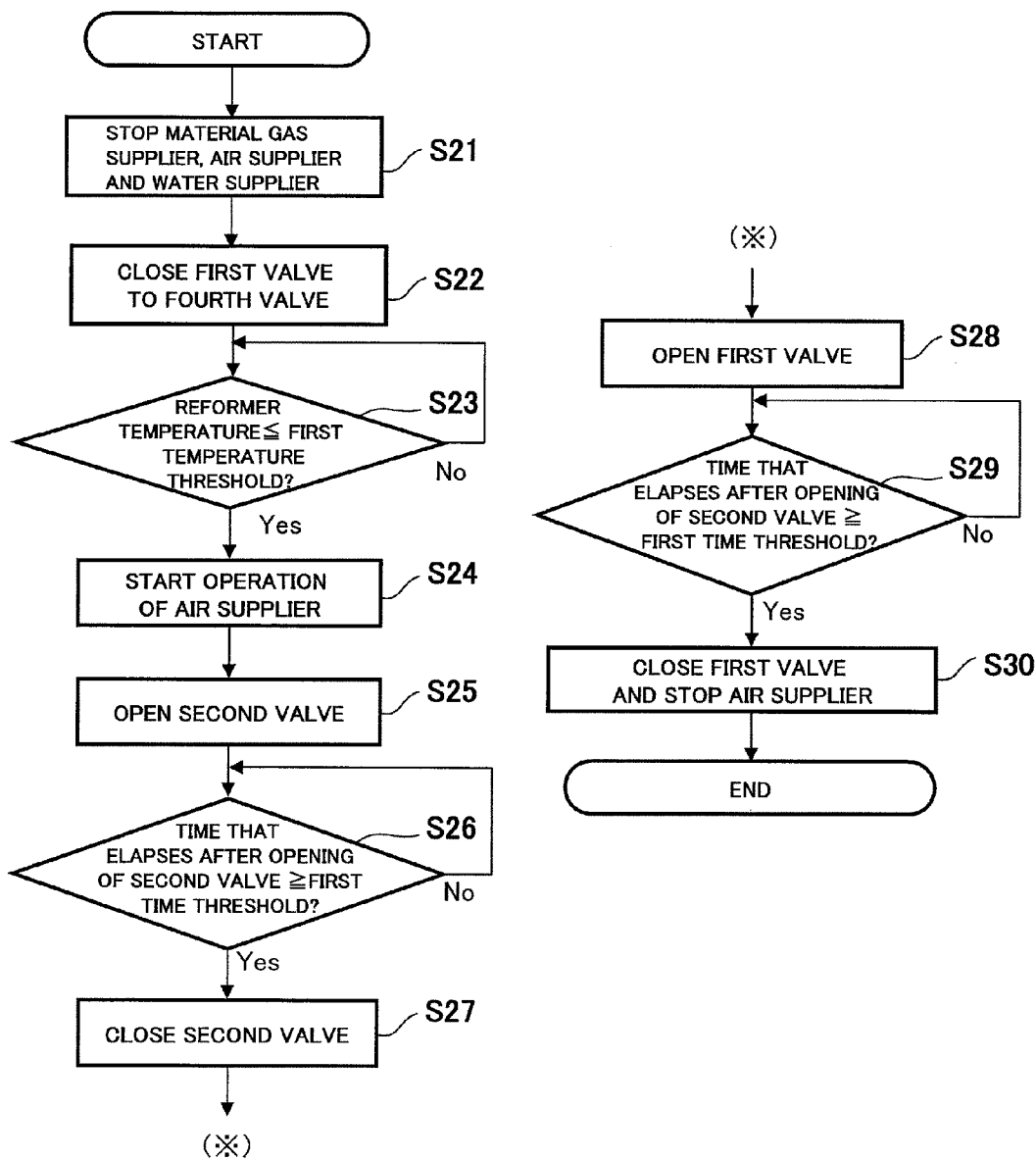
FIG. 5 is a flowchart showing an exemplary operation performed at the time of shutdown of the hydrogen generator according to Embodiment 2.

FIG. 4 is a timing chart of the operation performed at the time of shutdown of the hydrogen generator 100 according to Embodiment 2. FIG. 5 is a flowchart showing an exemplary operation performed at the time of shutdown of the hydrogen generator 100 according to Embodiment 2. In Embodiment 2, the pressure compensation process may be performed in the stand-by mode after the shutdown process is completed. Alternatively, the pressure compensation process may be performed concurrently with the shutdown process.

Initially, as shown in FIGS. 4 and 5, the controller 10 stops the operation of the combustor 4, the operation of the material gas supplier 5 and the operation of the water supplier 6 to stop the operation for generating the hydrogen-containing gas in the hydrogen generator 100, as in Embodiment 1 (step S21). In addition, the controller 10 closes the first valve 41 to the fourth valve 44 (step S22). Thereby, the supply of the material gas and the supply of water to the hydrogen generator 100 stop, and the sealing operation for the hydrogen generator 100 is performed.

Then, the controller 10 detects the temperature of the reformer 1 using the temperature sensor 51, and determines whether or not the detected temperature value is not higher than the first temperature threshold (step S23). The first temperature threshold is defined as a temperature at which it is estimated that the pressure in the hydrogen generator 100 which decreases with the temperature decrease is not higher than a first pressure threshold which is higher than the negative pressure resistance limit value of the hydrogen generator 100 and is not higher than a predetermined pressure value which is lower than a gas pressure of a material gas supply source (e.g., city gas tank or propane gas tank).

If it is determined that the temperature detected by the temperature sensor 51 is not higher than the first temperature threshold (Yes in step S23), the controller 10 starts the operation of the air supplier 8 and opens the second valve 42 (step S25). As a result, the pressure in the hydrogen generator 100 is released into the atmosphere via the combustor 4 if the pressure in the hydrogen generator 100 before opening of the second valve 42 is higher than the atmospheric pressure. This reduces the chance that the steam or liquid water will outflow from the hydrogen generator 100 and clog the material gas supply passage 21, when the first valve 41 is opened and the supply of the material gas starts for the pressure compensation process. Although the air supplier 8 is operated prior to opening of the second valve 42 in Embodiment 2, the air supplier 8 may be operated at the same time that the second valve 42 is opened, or after the second valve 42 is opened.

Then, the controller 10 obtains a time that elapses after the second valve 42 is opened. If it is determined that the time is not shorter than the first time threshold (Yes in step S26), the controller 10 closes the second valve 42 (step S27). This allows the pressure in the passages within the hydrogen generator 100 to be not higher than the pressure in the material gas supply passage 21.

Then, the controller 10 opens the first valve 41 (step S28). In this case, since the pressure in the passages within the hydrogen generator 100 is lower than the pressure in the material gas supply source, the material gas flows into the passages within the hydrogen generator 100, without increasing the pressure in the material gas supplier 5, etc. This increases the pressure in the passages within the hydrogen generator 100.

Then, the controller 10 obtains a time that elapses after the first valve 41 is opened, and determines whether or not the time is not shorter than a third time threshold (step S29). The third time threshold is set as a time threshold at which it is estimated that the pressure in the hydrogen generator 100 closed by the second valve 42 reaches a pressure which is not lower than a second pressure threshold which is higher than the first pressure threshold, by the pressure compensation process. For example, the third time threshold is set as a time when the pressure in the hydrogen generator 100 is substantially equal to the pressure in the material gas supply source by the pressure compensation process.

If it is determined that the time that elapses from the start of the pressure compensation process is not shorter than the third time threshold (Yes in step S29), the controller 10 closes the first valve 41 and stops the air supplier 8 (step S30). Thereby, the pressure compensation process terminates.

The temperature detected by the temperature sensor 51 for indirectly detecting the internal pressure value of the sealed hydrogen generator 100 is used to determine whether or not to perform the pressure compensation process in Embodiment 2. Alternatively, in a method of indirectly detecting the pressure in the hydrogen generator 100, the time that elapses after the start of the shutdown process, or the time that elapses after the start of the stand-by mode, which is associated with the above identified pressure value, may be used to determine whether or not to perform the pressure compensation process.

As should be readily understood from the above, in accordance with the hydrogen generator 100 of Embodiment 2, the second valve 42 is opened prior to opening of the first valve 41 so that the internal pressure is released into atmosphere even when the pressure in the hydrogen generator 100 is higher than the supply pressure of the material gas, when the pressure compensation process is performed. This reduces a chance that the steam or liquid water will outflow from the hydrogen generator 100 and clog the material gas supply passage 21 at the start of the pressure compensation process.

(Embodiment 3)

In Embodiment 3 of the present disclosure, an exemplary operation at the start-up of the hydrogen generator 100 will be described.

In the hydrogen generator 100 of Embodiment 3, the controller 10 is configured to open the second valve 42 prior to opening of the first valve 41 when the supply of the material gas to the hydrogen generator 100 (reformer 1) starts in a start-up process of the hydrogen generator 100. This reduces the chance that the steam or liquid water will outflow from the hydrogen generator 100 and clog the material gas supply passage 21, before the supply of the material gas to the hydrogen generator 100 (reformer 1) starts in the start-up process.

The start-up process is defined as a process performed from when a fuel gas containing a high-concentration hydrogen gas is generated in the hydrogen generator 100 immediately before the supply of the fuel gas to the hydrogen consuming device 101 starts. Specifically, the start-up process includes a process for increasing the temperature of the reformer 1 until the temperature of the reformer 1 reaches a temperature suitable for generating the fuel gas (hereinafter referred to as a temperature increasing step).

In the hydrogen generator of Embodiment 3, the controller 10 is configured to open the first valve 41 and to operate the ignition device 3, after supplying the air from the air supplier 8, when the start-up operation of the hydrogen generator 100 is performed.

The phrase "open the first valve 41 and operate the ignition device 3" means that the opening of the first valve 41 and the start of the operation of the ignition device 3 occur at the same timing or different timings.

[Operation of Hydrogen Generator]

The operation at the start-up of the hydrogen generator 100 of Embodiment 3 of the present disclosure will now be described. The hydrogen generator 100 of Embodiment 3 has basically the same configuration as that of the hydrogen generator 100 of Embodiment 1, and therefore detailed description thereof will be omitted.

Figure 6:
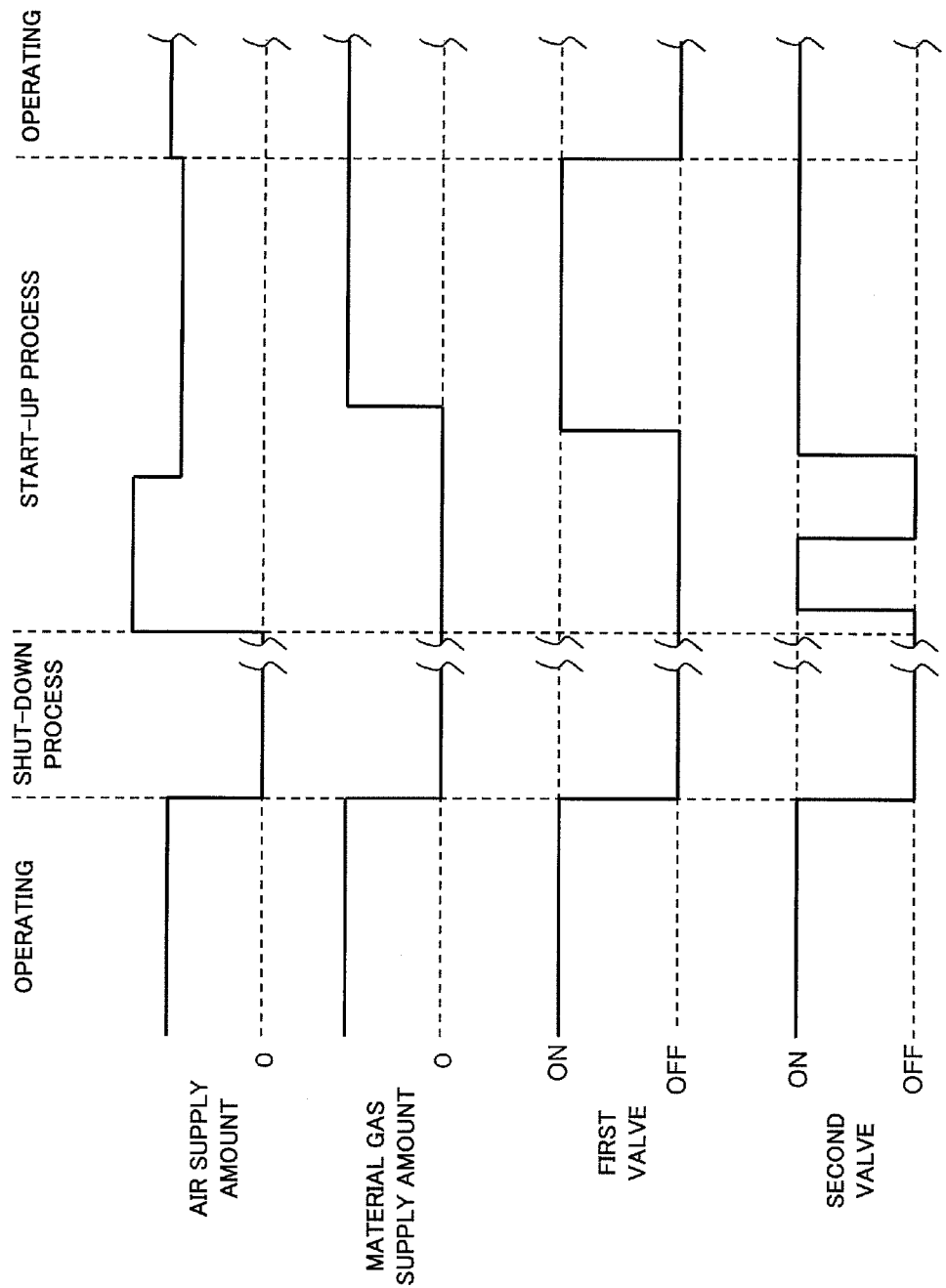
FIG. 6 is a timing chart of the operation performed at the time of start-up of a hydrogen generator according to Embodiment 3.
Figure 7:
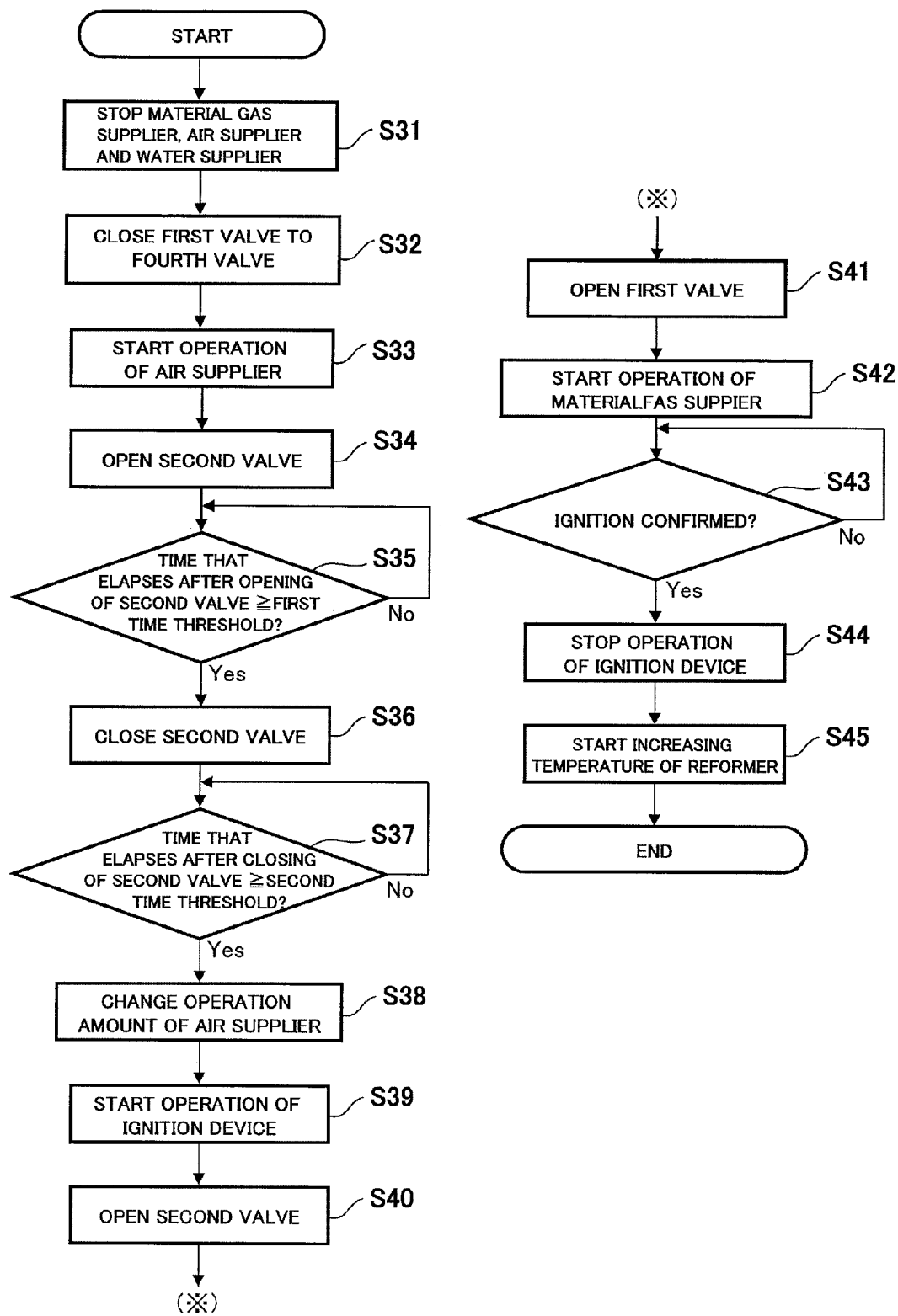
FIG. 7 is a flowchart showing an exemplary operation performed at the time of start-up of the hydrogen generator according to Embodiment 3.

FIG. 6 is a timing chart of the operation performed at the time of start-up of the hydrogen generator 100 according to Embodiment 3. FIG. 7 is a flowchart showing an exemplary operation performed at the time of start-up of the hydrogen generator 100 according to Embodiment 3. In Embodiment 3, the start-up process is performed after the hydrogen generator 100 completes the shut-down process and transitions to the stand-by mode.

Initially, similarly to Embodiment 1, as shown in FIGS. 6 and 7, the controller 10 stops the operation of the combustor 4, the operation of the material gas supplier 5 and the operation of the water supplier 6 to stop the operation for generating the hydrogen-containing gas in the hydrogen generator 100 (step S31), and closes the first valve 41 to the fourth valve 44 (step S32). Thereby, the supply of the material gas and the supply of the water to the hydrogen generator 100 stop and the sealing operation for the hydrogen generator 100 is performed. Thereafter, a predetermined shutdown operation is performed and the shutdown process is completed. In this state, the hydrogen generator 100 transitions to a stand-by mode in which the hydrogen generator 100 is awaiting the next start-up.

Upon a start-up request being entered by, for example, the user's operation of a remote controller, the controller 10 outputs a start-up command. In response to this, the air supplier 8 starts its operation (step S33), and the second valve 42 opens (step S34). Thereby, the pressure in the hydrogen generator 100 is released into the atmosphere via the combustor 4, if the pressure in the hydrogen generator 100 before opening of the second valve 42 is higher than the atmospheric pressure. This reduces the chance that the steam or liquid water will outflow from the hydrogen generator 100 and clog the material gas supply passage 21 when the first valve 41 is opened to start the supply of the material gas for the start-up process. Although the air supplier 8 is operated prior to opening of the second valve 42 in Embodiment 3, the air supplier 8 may be operated at the same time that the second valve 42 is opened, or after the second valve 42 is opened.

Then, the controller 10 obtains a time that elapses from when the second valve 42 is opened. If it is determined that the time is not shorter than a first time threshold (Yes in step S35), the controller 10 closes the second valve 42 (step S36). If it is determined that the time that elapses after closing of second valve 42 is not shorter than the second time threshold (Yes in step S37), the controller 10 changes the operation amount of the air supplier 8 (step S38), and starts the operation of the ignition device 3 (step S39). The order of step S38 and step S39 may be reversed.

Then, the controller 10 opens the second valve 42 (step S40), thereafter opens the first valve 41 (step S41), and starts the operation of the material gas supplier 5 (step S42). Thereby, the material gas is supplied from the material gas supplier 5 to the passages within the hydrogen generator 100 including the reformer 1, and the gas containing the material gas which has flowed through the interior of the hydrogen generator 100 is supplied to the combustor 4.

If it is determined that ignition has occurred in the combustor 4 using an ignition detector (not shown) (Yes in step S43), the controller 10 stops the operation of the ignition device 3 (step S44). The constituents in the hydrogen generator 100 such as the reformer 1 rise in temperature, and the start-up process terminates.

In accordance with the hydrogen generator 100 of Embodiment 3, when the material gas supplier 5 starts the supply of the material gas to the hydrogen generator 100 in the start-up process of the hydrogen generator 100, the second valve 42 is opened prior to the opening of the first valve 41. As a result, the pressure in the hydrogen generator 100 is released into the atmosphere if the pressure in the hydrogen generator 100 is higher than the supply pressure of the material gas. This reduces the chance that the steam or liquid water will outflow from the hydrogen generator 100 and clog the material gas supply passage 21.

(Embodiment 4)

In Embodiment 4 of the present disclosure, a communicating passage and a second valve are provided at a fluid passage which is upstream of the reformer.

The hydrogen generator 100 of Embodiment 4 includes a deodorizer 11 provided at a portion of the material gas supply passage 21 which is located upstream of the first valve 41 and configured to remove an odor component contained in the material gas. In the hydrogen generator 100 so configured, a depressurization process is performed in advance when the material gas supplier 5 resumes the supply of the material gas to the hydrogen generator 100. Thereby, the steam from the hydrogen generator 100 is prevented from flowing into the deodorizer 11. As a result, it is possible to suppress degradation of the deodorizer 11 which would otherwise occur due to adhesion of the steam to a deodorizer agent in the deodorizer 11.

The hydrogen generator 100 of Embodiment 4 may further include a recovered water tank 12 which is configured to store the water recovered from a combustion exhaust gas exhausted from the combustor 4 and is open to the atmosphere. The communicating passage may be connected to the recovered water tank 12.

[Configuration of Hydrogen Generator]

Next, the configuration of the hydrogen generator 100 according to Embodiment 4 of the present disclosure will be described.

Figure 8:
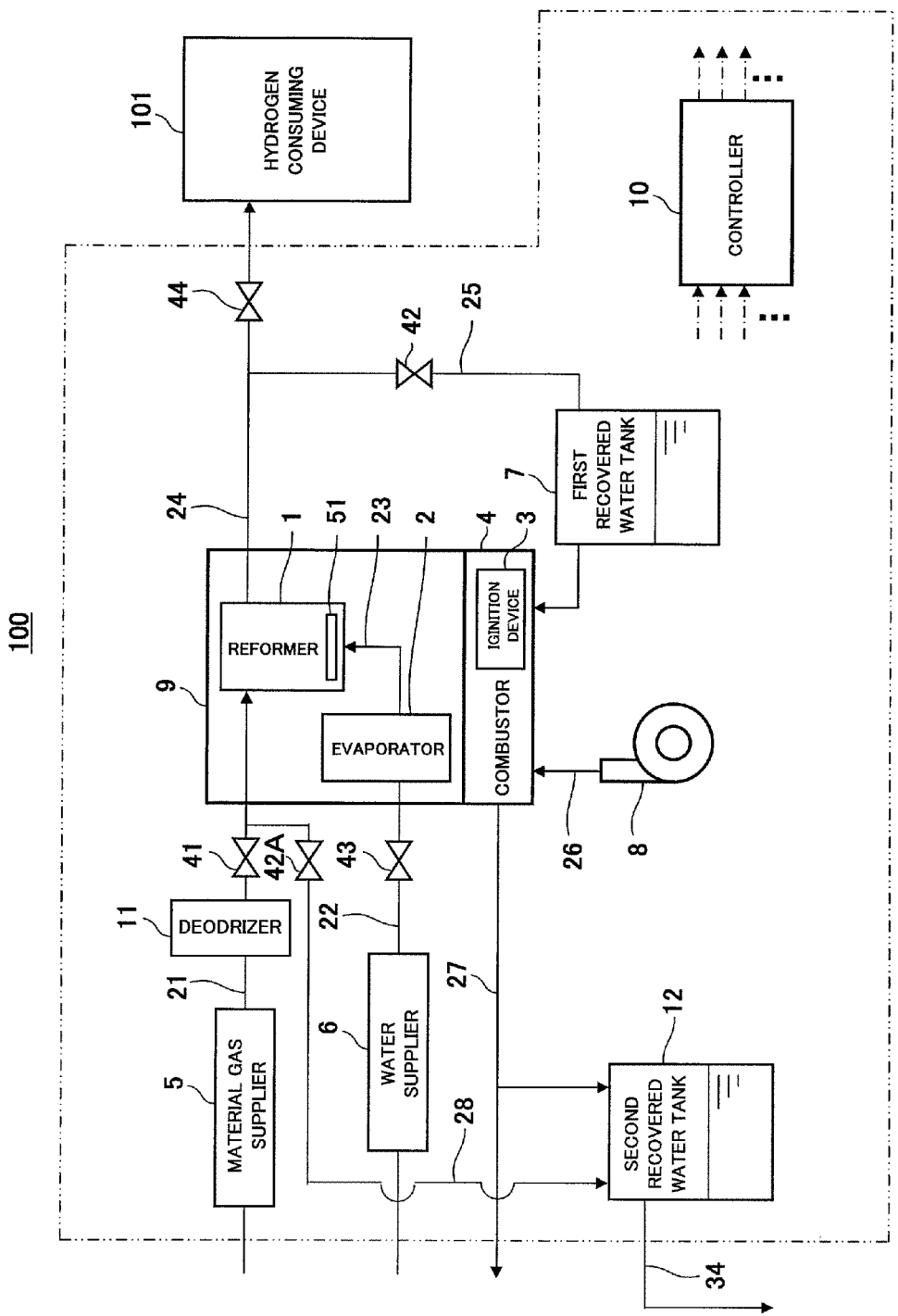
FIG. 8 is a schematic view of an exemplary configuration of a hydrogen generator according to Embodiment 4 of the present disclosure.

FIG. 8 is a schematic view of an exemplary configuration of the hydrogen generator 100 according to Embodiment 4 of the present disclosure.

Referring to FIG. 8, the hydrogen generator 100 of Embodiment 4 basically has the same configuration as that of the hydrogen generator 100 of Embodiment 1, and therefore only the difference between them will be described hereinafter.

In the hydrogen generator 100 of Embodiment 4, the deodorizer 11 is provided at a portion of the material gas supply passage 21 which is located upstream of the first valve 41. The deodorizer 11 is configured to remove the odor component contained in the material gas and may include an active carbon or a filter. In this Embodiment, the deodorizer 11 is positioned between the material gas supplier 5 and the first valve 41, but may be positioned elsewhere so long as the deodorizer 11 is positioned at a portion of the material gas supply passage 21 which is located upstream of the first valve 41. For example, the deodorizer 11 may be positioned upstream of the material gas supplier 5.

A depressurization passage 28 is provided, which branches from the material gas supply passage 21 at a point between the first valve 41 in the material gas supply passage 21 and the reformer 1. The downstream end of the depressurization passage 28 is coupled to the second recovered water tank 12. At a portion of the depressurization passage 28, a second valve 42A is provided. The second valve 42A is configured to be opened and closed to permit and inhibit the flow of the gas such as the material gas in the depressurization passage 28. The second valve 42A is an example of the "second valve."

The second recovered water tank 12 is open to the atmosphere, and is coupled to the combustor 4 through a combustion exhaust gas passage 27. The recovered water tank 12 is configured to recover the water contained in the combustion exhaust gas generated in the combustor 4. To be specific, the second recovered water tank 12 is configured to store the water condensed while the water is flowing through the combustion exhaust gas passage 27. A recovered water discharge passage 34 which is an overflow pipe used to discharge water which exceeds a predetermined water level, from the recovered water in the second recovered water tank 12, to outside the hydrogen generator 100. The downstream end of the recovered water discharge passage 34 opens to atmosphere. The second recovered water tank 12 opens to atmosphere via the recovered water discharge passage 34. Alternatively, a water condenser or the like may be provided at a portion of the combustion exhaust gas passage 27 and may be configured to store the water condensed by the water condenser. Although in Embodiment 4, the second recovered water tank 12 opens to atmosphere via the recovered water discharge passage 34, the present disclosure is not limited to this, but the second recovered water tank 12 may open to atmosphere via the combustion exhaust gas passage 27.

In the hydrogen generator 100 of Embodiment 4 configured as described above, the controller 10 is configured to perform a depressurization process in advance in at least one of the start-up process, the FP purge process, and the pressure compensation process, in a manner similar to that of Embodiment 1 to Embodiment 3, except that the second valve 42A is operated in place of the second valve 42 in the depressurization operation. Therefore, in Embodiment 4, the "communicating passage" consists of the depressurization passage 28.

In the hydrogen generator 100 of Embodiment 4 so configured, since the controller 10 operates the second valve 42A to perform the depressurization operation in advance in at least one of the start-up process, the FP purge process, and the pressure compensation process, the same advantage as those of the hydrogen generators 100 in Embodiment 1 to Embodiment 3 is achieved. In the hydrogen generator 100 of Embodiment 4, in the depressurization process, by operating the second valve 42A, the combustible gas such as the material contained in the gas flowing through the depressurization passage 28 is sent to the second recovered water tank 12. On the other hand, the air is supplied from the air supplier 8 to the second recovered water tank 12 through the combustion air supply passage 26, the combustor 4 and the combustion exhaust gas passage 27. Therefore, the combustible gas such as the material supplied to the second recovered water tank 12 is diluted with the air and exhausted to outside the hydrogen generator 100 as in the case of the hydrogen generators 100 of Embodiment 1 to Embodiment 3.

Although the controller 10 is configured to operate only the second valve 42A in Embodiment 4, the controller 10 may alternatively be configured to operate both of the second valve 42 and the second valve 42A. The hydrogen generator 100 may be configured similarly to Embodiment 1 to Embodiment 3 except that the deodorizer 11 is provided upstream of the first valve 41 and may be configured to operate the second valve 42 to depressurize the hydrogen generator 100 in advance.

(Modifications 1~6)

Figure 9:
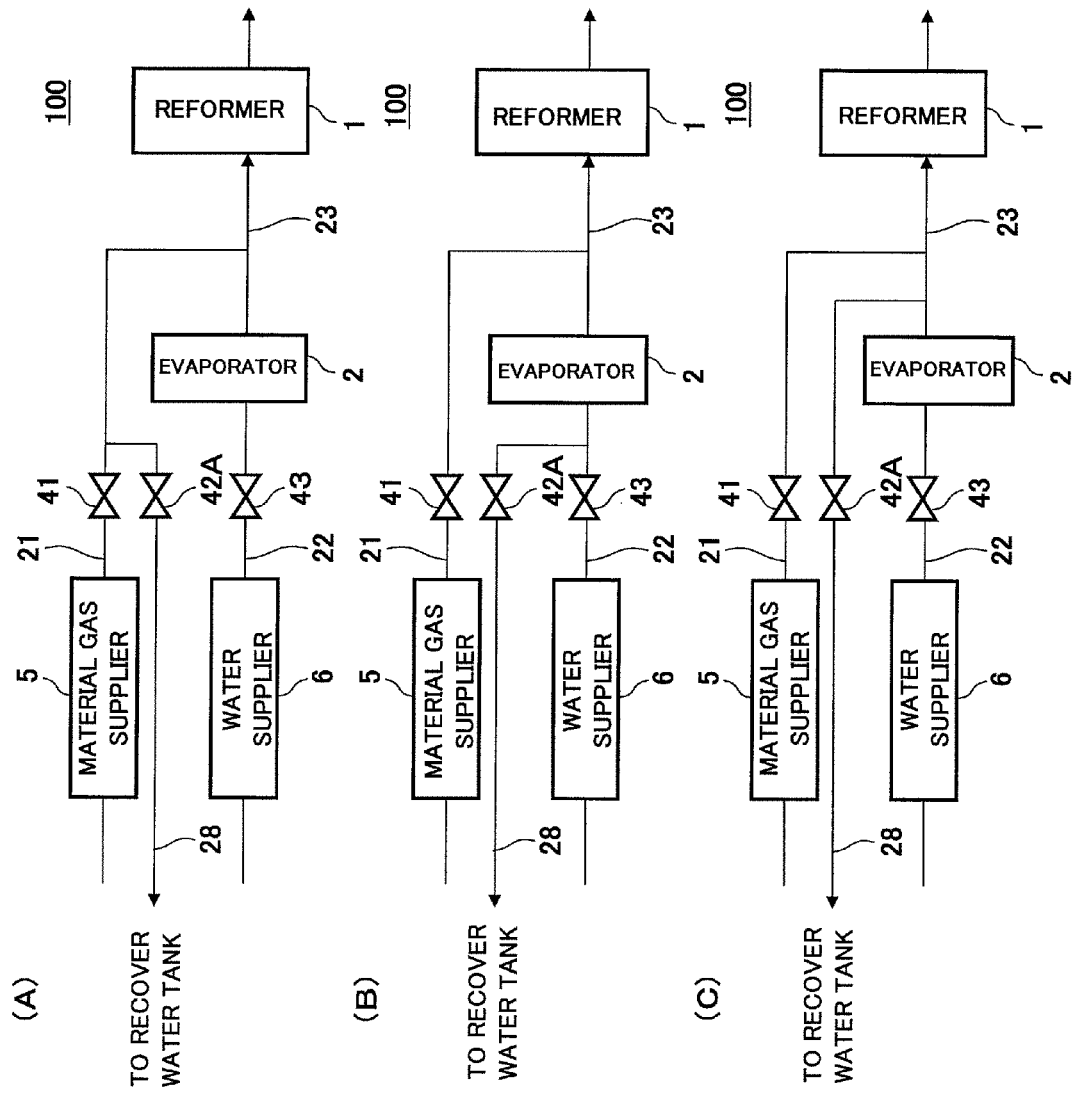
FIGS. 9A to 9C are schematic views of exemplary configurations of modifications of the hydrogen generator according to Embodiment 4.
Figure 10:
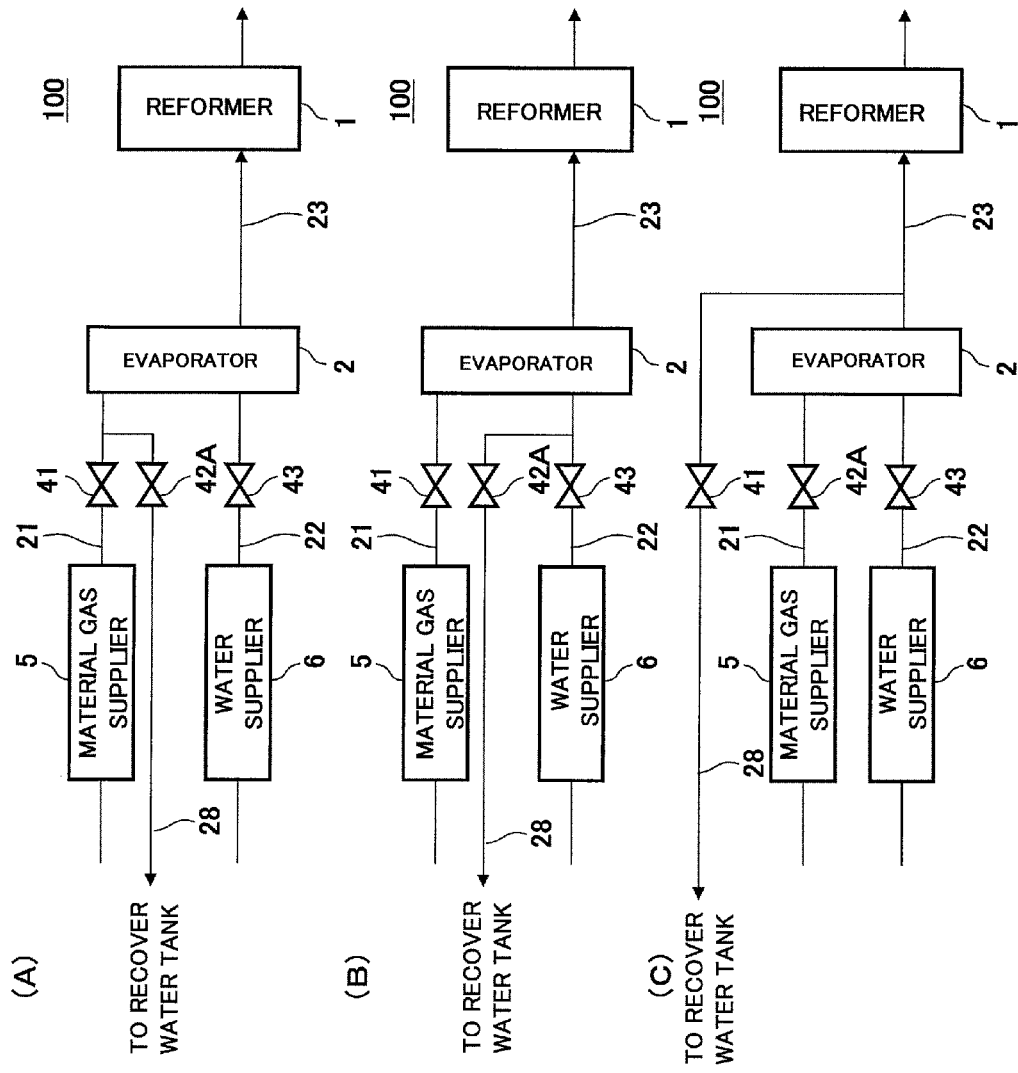
FIGS. 10A to 10C are schematic views of exemplary configurations of modifications of the hydrogen generator according to Embodiment 4.

Next, a modification of the hydrogen generator 100 of Embodiment 4 will be described with reference to FIGS. 9 and 10. In this modification, the communicating passage and the second valve 42 are provided at a fluid passage which is upstream of the reformer 1.

FIGS. 9(A) to 9(C) and FIGS. 10(A) to 10(C) are schematic views showing exemplary configurations of modifications of the hydrogen generator 100 of Embodiment 4. To be specific, FIG. 9(A) shows the hydrogen generator 100 of modification 1, FIG. 9(B) shows the hydrogen generator 100 of modification 2, and FIG. 9(C) shows the hydrogen generator 100 of modification 3. Also, FIG. 10(A) shows the hydrogen generator 100 of modification 4, FIG. 10(B) shows the hydrogen generator 100 of modification 5, and FIG. 10(C) shows the hydrogen generator 100 of modification 6. In FIGS. 9(A) to 9(C) and FIGS. 10(A) and 10(C), a part of the hydrogen generator 100 is omitted.

As shown in FIGS. 9(A) to 9(C) and FIGS. 10(A) to 10(C), the hydrogen generators 100 of modifications 1 to 6 have basically the same configurations as that of the hydrogen generator 100 of Embodiment 4, except with regard to a location to which a portion (i.e., downstream end) of the material gas supply passage 21 is connected and a location to which a portion (i.e., upstream end) of the depressurization passage 28 is connected. In any of modifications 1 to 6, the pressurization passage 28 is provided at a passage which is located upstream of the reformer 1 and downstream of the first valve 41 or the third valve 43.

To be specific, as shown in FIGS. 9(A) to 9(C), in the hydrogen generators 100 in modifications 1 to 3, the downstream end of the material gas supply passage 21 is connected to the steam supply passage 23. In modification 1, the upstream end of the depressurization passage 28 is connected to a portion of the material gas supply passage 21 which is located downstream of the first valve 41. In modification 2, the upstream end of the depressurization passage 28 is connected to a portion of the water supply passage 22 which is located downstream of the third valve 43. In modification 3, the upstream end of the depressurization passage 28 is connected to a portion of, for example, the steam supply passage 23 which is located downstream of the first valve 41 and the third valve 43. In the hydrogen generators 100 in modifications 1 to 3, the second valve 42A is positioned upstream of the reformer 1. As used herein, the term "upstream of the reformer 1" refers to an upstream side in the flow direction of the material gas and steam supplied to the reformer 1.

As shown in FIGS. 10(A) to 10(C), in the hydrogen generators 100 in modifications 4 to 6, the upstream end of the material gas supply passage 21 is connected to the evaporator 2. In modification 4, the upstream end of the depressurization passage 28 is connected to a portion of the material gas supply passage 21 which is located downstream of the first valve 41. In modification 5, the upstream end of the depressurization passage 28 is connected to a portion of the water supply passage 22 which is located downstream of the third valve 43. In modification 6, the upstream end of the depressurization passage 28 is connected to a portion of, for example, the steam supply passage 23 which is located downstream of the first valve 41 and the third valve 43. In the hydrogen generators 100 in modifications 4 to 6, the second valve 42A is positioned upstream of the reformer 1.

The hydrogen generators 100 in modifications 1 to 6 configured as described above are able to achieve the same advantage as that of the hydrogen generator 100 of Embodiment 4.

[Modification 7]

Figure 11:
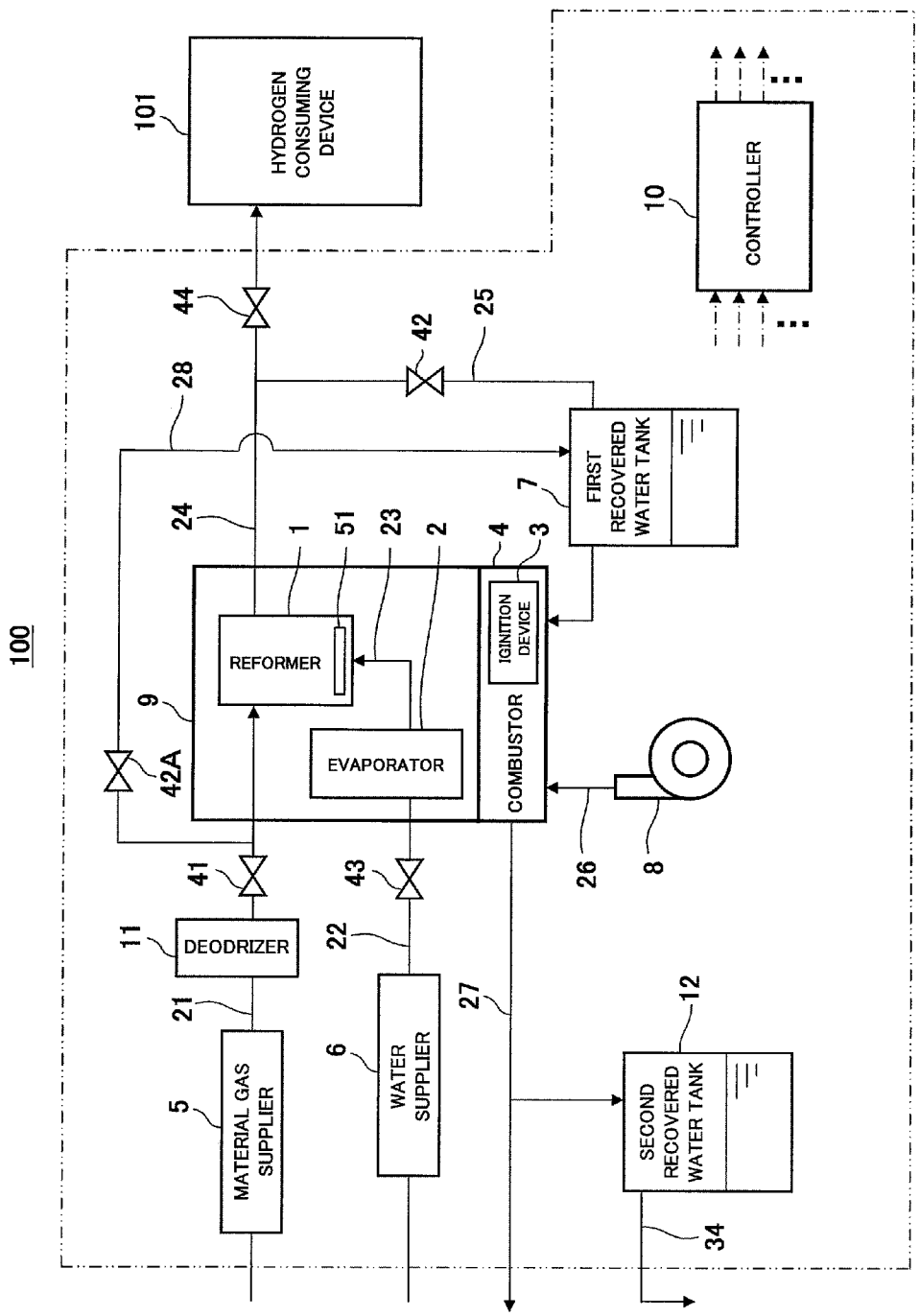
FIG. 11 is a schematic view of an exemplary configuration of modification 7 of the hydrogen generator according to Embodiment 4.

FIG. 11 is a schematic view of an exemplary configuration of modification 7 of the hydrogen generator 100 according to Embodiment 4. As shown in FIG. 11, in the hydrogen generator 100 of modification 7, the downstream end of the pressurization passage 28 is connected to the first recovered water tank 7 instead of the second recovered water tank 12. The hydrogen generator 100 of modification 7 configured as described above is able to achieve the same advantage as that of the hydrogen generator 100 of Embodiment 4.

In the hydrogen generator 100 of modification 7, in the depressurization process, the second valve 42A is operated to supply the combustible gas such as the material contained in the gas flowing through the depressurization passage 28, to the first recovered water tank 7 and to the combustor 4. Therefore, similarly to the hydrogen generators 100 of Embodiment 1 to Embodiment 3, the combustible gas is diluted with the air supplied from the air supplier 8 via the combustion air supply passage 26 and is exhausted to outside the hydrogen generator 100.

(Embodiment 5)

In Embodiment 5 of the present disclosure, the hydrogen consuming device 101 is a fuel cell.

The fuel cell system of Embodiment 5 of the present disclosure includes the hydrogen generator 100 of Embodiment 1 and the fuel cell 101 configured to generate electric power using the hydrogen-containing gas supplied from the hydrogen generator 100.

In the fuel cell system of Embodiment 5 configured as described above, the depressurization operation in Embodiment 1 to Embodiment 3 is performed in advance in at least one of the start-up process, the FP purge process, and the pressure compensation process.

In this manner, if the pressure in the hydrogen generator 100 before opening of the second valve 42 is higher than the atmospheric pressure, the pressure is released into the atmosphere via the combustor 4. This reduces the chance that steam or liquid water will outflow from the hydrogen generator 100 and clog the material gas supply passage 21 when the first valve 41 is opened to start the supply of the material gas.

Furthermore, in the fuel cell system of Embodiment 5, the combustor 4 is configured to combust an off-gas exhausted from an anode of the fuel cell 101. The controller 10 is configured to set the operation amount of the air supplier 8 larger than that in the state where the fuel cell 101 is generating a maximum electric power, when the second valve 42 is opened to depressurize the hydrogen generator 11.

In this configuration, the gas containing the combustible gas depressurized by opening the second valve 42 is diluted by the air supplied from the air supplier 8 so that its combustible gas concentration is lower, and exhausted to outside the fuel cell system.

[Configuration of Fuel Cell System]

Figure 12:
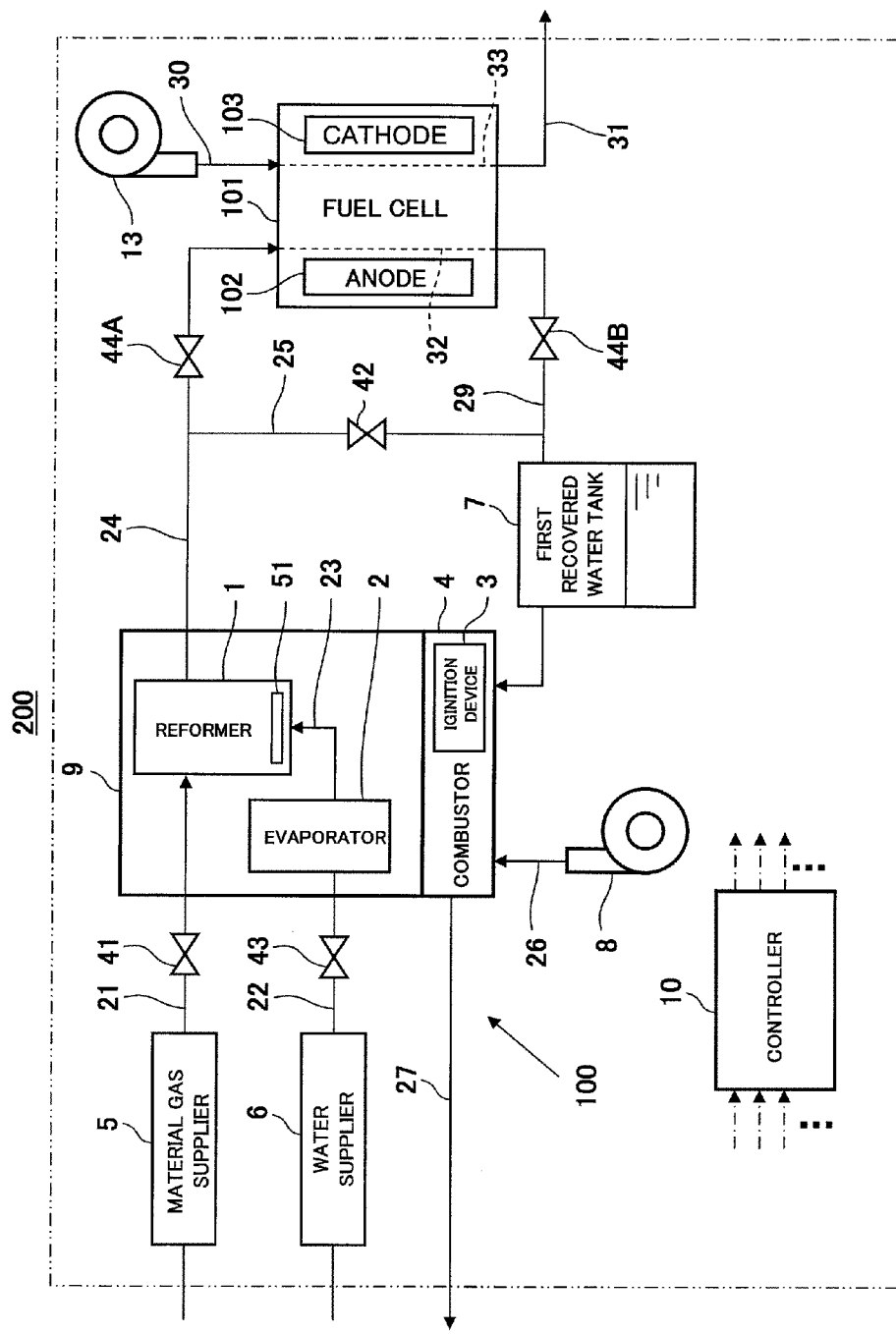
FIG. 12 is a schematic view of an exemplary configuration of a fuel cell system according to Embodiment 5.

Subsequently, the configuration of a fuel cell system 200 of Embodiment 5 will be described with reference to FIG. 12. FIG. 12 is a schematic view of an exemplary configuration of the fuel cell system 200 according to Embodiment 5 of the present disclosure.

As shown in FIG. 12, the fuel cell system 200 of Embodiment 5 includes the hydrogen generator 100, the fuel cell 101, and a cathode air supplier 13. The fuel cell 101 includes an anode 102 and a cathode 103. The fuel cell 101 is provided with a fuel gas passage 32 through which a fuel gas is supplied to the anode 102 and an oxidizing gas passage 33 through which an oxidizing gas, for example, air is supplied to the cathode 103.

The upstream end of the fuel gas passage 32 in the fuel cell 101 is connected to the reformer 1 via the fuel gas supply passage 24, while the downstream end of the fuel gas passage 32 is connected to the combustor 4 via a fuel gas exhaust passage 29. The upstream end of the oxidizing gas passage 33 is connected to the oxidizing gas supplier 13 via an oxidizing gas supply passage 30, while the downstream end of the oxidizing gas passage 33 is connected to an oxidizing gas exhaust passage 31.

The fuel cell 101 is configured to generate electricity and heat through an electrochemical reaction between the fuel gas supplied to the anode 102 and the air supplied to the cathode 103. An extra fuel gas remaining unconsumed in the anode 102 (off-fuel-gas exhausted from the anode 102) is supplied to the combustor 4 via the fuel gas exhaust passage 29, while an extra oxidizing gas remaining unconsumed in the cathode 103 is exhausted to outside the fuel cell system 200, i.e., atmosphere. The combustor 4 is configured to combust the off-fuel-gas exhausted from the anode 102 of the fuel cell 101 and the air supplied from the air supplier 8.

The bypass passage 25 branches from the fuel gas supply passage 24 and is joined to the fuel gas exhaust passage 29 to form a common passage which is connected to the combustor 4. The first recovered water tank 7 is provided at a portion of the fuel gas exhaust passage 29.

A fourth valve 44A is provided at the fuel gas supply passage 24, while a fourth valve 44B is provided at the fuel gas exhaust passage 29.

In Embodiment 5, the "communicating passage" includes a portion of the fuel gas supply passage 24 which is upstream of the branch portion from which the bypass passage 25 branches from the fuel gas supply passage 24, the bypass passage 25, a portion of the fuel gas exhaust passage 29 which is downstream of a joint portion where the fuel gas exhaust passage 29 is joined to the bypass passage 25, the combustor 4 and the combustion exhaust gas passage 27.

In Embodiment 5, the controller 10 is configured to control constituents other than the hydrogen generator 100 in the fuel cell system 200. The controller 10 is configured to perform the depressurization operation in advance in Embodiment 1 to Embodiment 3 in at least one of the start-up process, the FP purge process, and the pressure compensation process. In this case, the controller 10 is configured to set the operation amount of the air supplier 8 in the depressurization operation for the passages within the hydrogen generator 100 larger than that in the state where the fuel cell 101 is generating a maximum electric power. To be more specific, the controller 10 is configured to control the operation amount of the air supplier 8 such that the operation amount in the air supply operation (e.g., step S4 in FIG. 3) in the depressurization operation before the FP purge process or the air supply operation (e.g., step S34 in FIG. 7) in the depressurization operation before starting the supply of the material gas to the hydrogen generator 100 in the start-up process is set larger than the operation amount of the air supplier 8 in the state where the fuel cell 101 is generating a maximum electric power.

The fuel cell system 200 of Embodiment 5 is able to achieve the same advantages as those of the hydrogen generators 100 of Embodiment 1 to Embodiment 3.

Although the fuel cell system 200 in Embodiment 5 includes the hydrogen generator 100 of Embodiment 1, it may alternatively include any one of the hydrogen generator 100 of Embodiment 4 and the hydrogen generators 100 of modifications 1 to 7 and may perform the depressurization operation in advance in a manner similar to those of these hydrogen generators 100, when the supply of the material gas is resumed.

[Modification 1]

Next, modification 1 of the fuel cell system 200 of Embodiment 5 will be described.

The fuel cell system 200 of modification 1 of Embodiment 5 has a configuration which is basically identical to that of the fuel cell system 200 of Embodiment 5 but is different from the same in that the "communicating passage" includes the fuel gas supply passage 24, the fuel gas passage 32, the fuel gas exhaust passage 29, the combustor 4 and the combustion exhaust gas passage 27, and the "second valve" includes a valve of the fourth valves 44A and 44B, which is closed prior to each of the start-up process, the FP purge process and the pressure compensation process. To be specific, in the fuel cell system 200 of modification 1, the controller 10 is configured to open the closed one of the fourth valves 44A and 44B, as the "second valve," when the depressurization process operation in advance in Embodiments 1 to 3 is performed, in at least one of the start-up process, the FP purge process and the pressure compensation process.

To be specific, for example, when the depressurization operation is performed before performing the start-up process of FIG. 3, the controller 10 closes at least one of the fourth valves 44A and 44B in step S2, opens one of the fourth valves 44A and 44B which is closed in step S2 as the "second vale" in step S5, obtains time which lapses after the opening of the second valve, and determines whether or not the lapse time is not shorter than a first time threshold (step S6). In step S7, the controller 10 closes at least one of the fourth valves 44A and 44B which is opened as the "second valve" in step S5. Then, the controller 100 performs the step 8 and the following steps, using one of the fourth valves 44A and 44B which is closed in step S2, as the "second valve." In addition, in the same manner, when the depressurization operation (FIGS. 5 and 7) is performed before the FP purge process and the pressure compensation process, the controller 110 executes the programs using the valve of the fourth valves 44A and 44B which is closed before the process, as the "second valve."

The fuel cell system 200 of modification 1 configured as described above is able to achieve the same advantage as that of the fuel cell system 200 of Embodiment 5. Although in the fuel cell system 200 of modification 1, the bypass passage 25 and the second valve 42 are provided, they may be omitted. Since it is desired that at least the fourth valve 44B be closed, i.e., at least the fourth valve 44B be the "second vale," to suppress diffusion and entry of atmospheric air into the fuel gas passage 32 of the fuel cell 101, before each of the start-up process, the FP purge process and the pressure compensation process is performed. In this case, the fourth valve 44A may be omitted.

[Modification 2]

Figure 13:
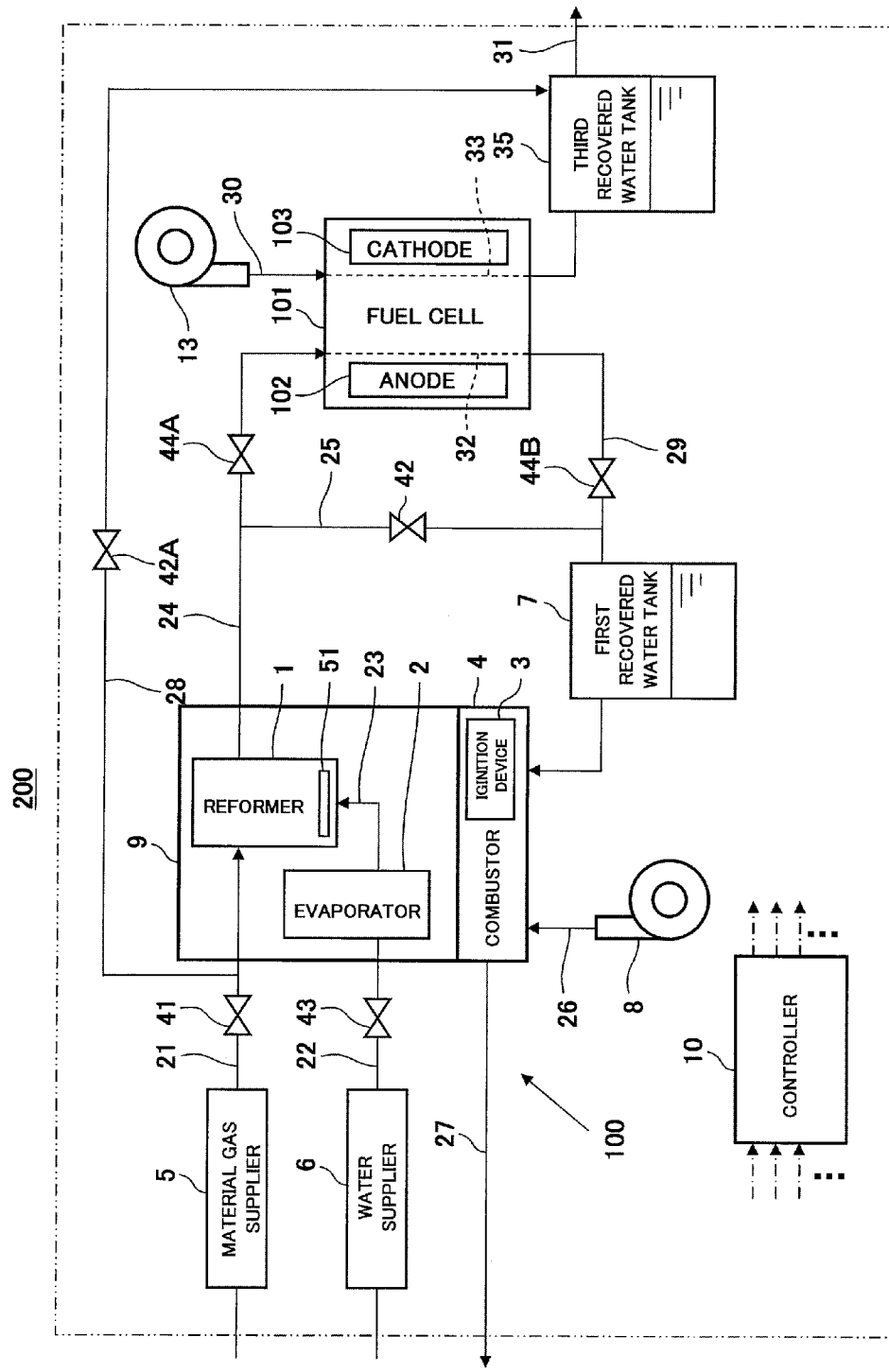
FIG. 13 is a schematic view of an exemplary configuration of modification 2 of the fuel cell system according to Embodiment 5 of the present disclosure.

FIG. 13 is a schematic view of an exemplary configuration of modification 2 of the fuel cell system 200 according to Embodiment 5.

As shown in FIG. 13, in the fuel cell system 200 of modification 2, a third recovered water tank 35 is provided at a portion of the oxidizing gas exhaust passage 31. The third recovered water tank 35 opens to atmosphere, via the oxidizing gas exhaust passage 31, in this embodiment. The depressurization passage 28 is provided to branch from the material gas supply passage 21 in a location between the first valve 41 and the reformer 1, and the downstream end of the pressurization passage 28 is connected to the third recovered water tank 35. The second valve 42A is provided at the pressurization passage 28 and is configured to be opened and closed to permit and inhibit the flow of the gas such as the material gas flowing through the depressurization passage 28. The third recovered water tank 35 is configured to recover water generated by liquefying the steam contained in the extra oxidizing gas remaining unconsumed in the cathode 103 and flowing through the oxidizing gas exhaust passage 31.

In this modification, the "communicating passage" is constituted by the depressurization passage 28.

The controller 10 is configured to perform the depressurization operation in advance in Embodiments 1 to 3 in at least one of the start-up process, the FP purge process, and the pressure compensation process. In this case, the controller 10 is configured to operate the oxidizing gas supplier 13 in a state where the second valve 42A is opened prior to the opening of the first valve 41.

Thereby, the gas containing the combustible gas which is depressurized by opening the second valve 42A is diluted to a lowered combustible gas concentration, with the air supplied from the oxidizing gas supplier 13, inside the third recovered water tank 35, and is exhausted to outside the fuel cell system 200 via the oxidizing gas exhaust passage 31.

The fuel cell system 200 of this modification configured as described above is able to achieve the same advantage as that of the fuel cell system 200 of Embodiment 5.

Numeral modifications and alternative embodiments of the present disclosure will be apparent to those skilled in the art in view of the foregoing description.

Accordingly, the description is to be construed as illustrative only, and is provided for the purpose of teaching those skilled in the art the best mode of carrying out the disclosure. The details of the structure and/or function may be varied substantially without departing from the spirit of the disclosure.

What is claimed is:

1. A method of operating a hydrogen generator comprising steps of:
   at shutdown of the hydrogen generator,
   (A) stopping supply of a material gas from a material gas supplier to a reformer via a material gas supply passage;
   (B) stopping supply of water from a water supplier to an evaporator;
   (C) closing the material gas supply passage using a first valve;
   (D) closing a passage through which a combustible gas exhausted from the reformer is supplied to a combustor, using a second valve;
   (E) opening the second valve prior to opening the first valve, when the material gas supplier resumes supply of the material gas to the reformer, after performing the step (A) to the step (D); and
   (F) starting supply of the material gas to the reformer in a state in which the combustor is not performing combustion, after the step (E).

2. The method according to claim 1, wherein in the step (E), the second valve is opened prior to opening the first valve in a purge process for purging at least a gas in the reformer with the material gas.

3. The method according to claim 1, wherein in the step (E), the second valve is opened prior to opening the first valve, in a pressure compensation process for setting a pressure in a passage within the hydrogen generator to a positive pressure relative to an atmospheric pressure.

4. The method according to claim 1, wherein in step (E), the second valve is opened prior to opening the first valve, before the combustor starts combustion at start-up of the hydrogen generator.

5. The method according to claim 1,
   wherein the hydrogen generator includes a deodorizer provided at the material gas supply passage to remove an odor component contained in the material gas; and
   wherein the first valve is provided at a portion of the material gas supply passage which is located downstream of the deodorizer.

6. The method according to claim 1, wherein:
   the hydrogen generator includes:
      a combustor to combust a combustible gas exhausted from the reformer and exhaust a combustion exhaust gas to atmosphere; and
      an air supplier to supply combustion air to the combustor, and
   the method further comprises a step of:
   (G) operating the air supplier in a state where the second valve is opened prior to opening the first valve.

7. A method of operating a fuel cell system, the method comprising:
   generating power by operating the fuel cell system; and
   the method of operating a hydrogen generator of claim 1, wherein:
   the fuel cell system includes the hydrogen generator including the reformer; the material gas supply passage; the first valve; the evaporator; the water supplier; the communicating passage for providing communication between the reformer and atmosphere; the second valve which opens and closes the communicating passage; and a fuel cell,
   the reformer is configured to generate a hydrogen-containing gas through a reforming reaction in an internal space thereof using the material gas and steam, and
   the evaporator is configured to generate the steam which is supplied to the reformer.

8. The method according to claim 7, wherein in the step (E), the second valve is opened prior to opening of the first valve and the oxidizing gas supplier configured to supply the oxidizing gas to the fuel cell operates.

* * * * *